United States Patent
Morita

(10) Patent No.: US 8,705,060 B2
(45) Date of Patent: Apr. 22, 2014

(54) DISPLAY INPUT DEVICE FOR ADDING AND DISPLAYING A SETTING SCREEN, DISPLAY METHOD FOR A DISPLAY INPUT DEVICE FOR ADDING AND DISPLAYING A SETTING SCREEN, AND IMAGE FORMING APPARATUS

(75) Inventor: Keiko Morita, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 213 days.

(21) Appl. No.: 13/216,503

(22) Filed: Aug. 24, 2011

(65) Prior Publication Data

US 2012/0050781 A1    Mar. 1, 2012

(30) Foreign Application Priority Data

Aug. 27, 2010    (JP) .................... 2010-191486

(51) Int. Cl.
    *G06F 17/00*    (2006.01)
(52) U.S. Cl.
    USPC ........... 358/1.13; 358/1.15; 399/81; 715/243; 715/244; 715/246; 715/247; 715/251; 715/252; 715/253; 715/273; 715/274
(58) Field of Classification Search
    USPC .................... 358/1.13, 1.15, 1.14; 399/81; 715/700–866, 243, 244, 246, 247, 251, 715/252, 253, 273, 274
    See application file for complete search history.

(56) References Cited

U.S. PATENT DOCUMENTS

| | | | | | |
|---|---|---|---|---|---|
| 7,853,946 | B2 * | 12/2010 | Minagawa | ..................... | 717/178 |
| 8,264,743 | B2 * | 9/2012 | Fukasawa | ..................... | 358/1.9 |
| 8,384,922 | B2 * | 2/2013 | Ohyama et al. | .............. | 358/1.13 |
| 2002/0083131 | A1 * | 6/2002 | Machida | ........................ | 709/203 |
| 2004/0194027 | A1 * | 9/2004 | Suzuki et al. | .................. | 715/515 |
| 2004/0223182 | A1 * | 11/2004 | Minagawa | ................... | 358/1.15 |
| 2007/0109580 | A1 * | 5/2007 | Yoshida | ........................ | 358/1.13 |
| 2008/0088865 | A1 * | 4/2008 | Nagai | ........................... | 358/1.13 |
| 2009/0129893 | A1 | 5/2009 | Masuyama | | |
| 2009/0316184 | A1 | 12/2009 | Ohyama et al. | | |

FOREIGN PATENT DOCUMENTS

| | | | |
|---|---|---|---|
| JP | 2004-326426 | A | 11/2004 |
| JP | 2007-86865 | A | 4/2007 |
| JP | 2009-130533 | | 6/2009 |
| JP | 2010-3120 | A | 1/2010 |

\* cited by examiner

*Primary Examiner* — Twyler Haskins
*Assistant Examiner* — Dennis Dicker
(74) *Attorney, Agent, or Firm* — Smith, Gambrell & Russell, LLP

(57) ABSTRACT

Provided is a display input device including: a display portion for displaying setting screens for setting items; a storage portion for storing: a program that is a combination of setting items and is invoked to cause the display portion to sequentially display the setting screen for each of the setting items selected and registered in advance; and data for additional display, which is used for determining whether or not to perform the additional display in which the setting screen is added to the program, and which setting screen is to be additionally displayed; an input portion for receiving an input made to invoke the registered program; and a processing portion for determining, when the registered program is invoked, an additional setting item, which is the setting item to be added, based on the data for additional display, and causing the display portion to additionally display the additional setting item.

13 Claims, 16 Drawing Sheets

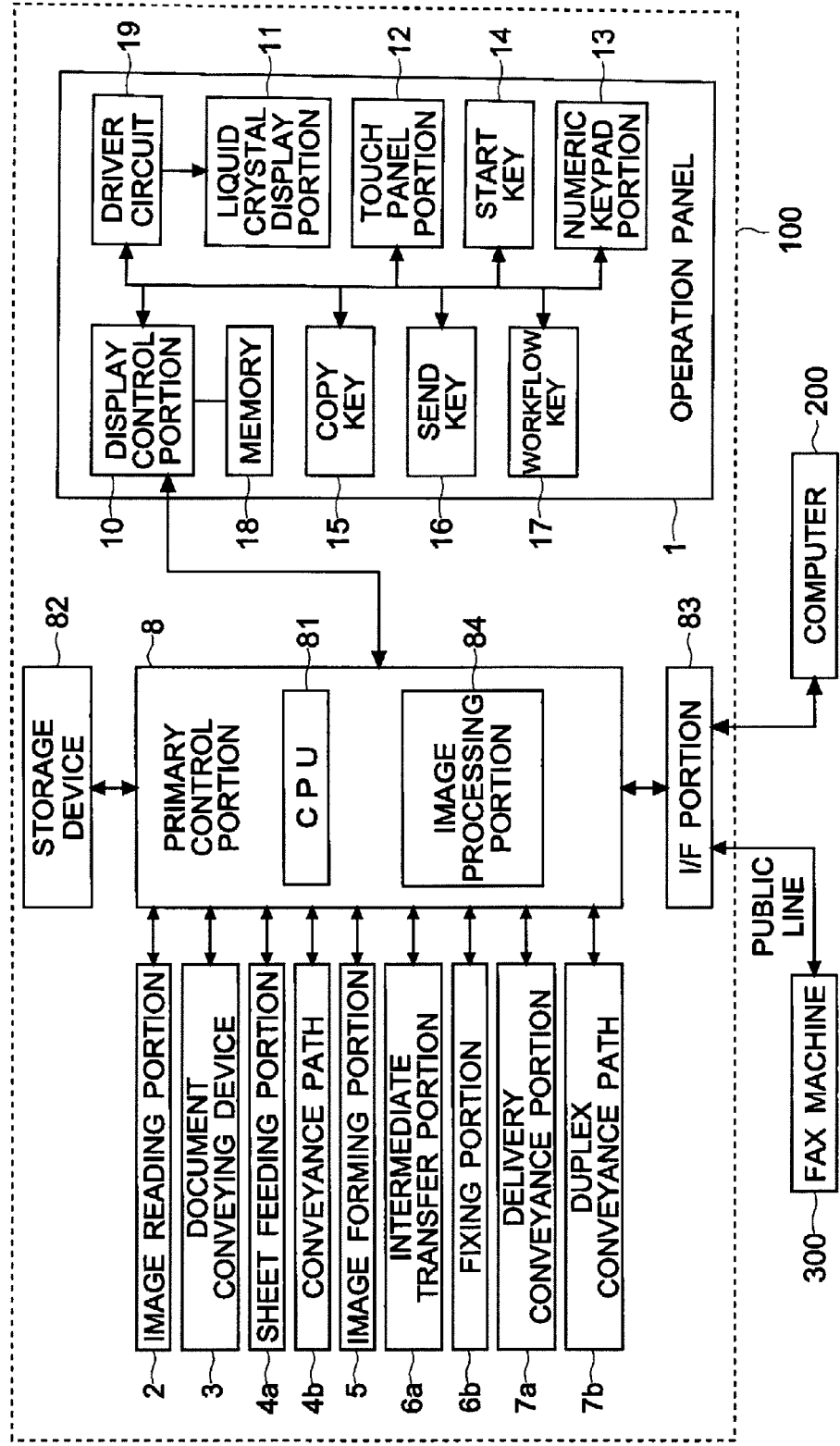

| Setting Item | Total Use Count | | Setting Item Used In Combination | | | | |
|---|---|---|---|---|---|---|---|
| | | | Density Adjustment | Poster | Color Setting | Aggregation | ... |
| Density Adjustment | 200 | Count Of Combined Use | | 30 | 28 | 15 | ... |
| | | Frequency | | 0.150 | 0.140 | 0.075 | ... |
| Poster | 40 | Count Of Combined Use | 30 | | 25 | 0 | ... |
| | | Frequency | 0.750 | | 0.625 | 0.000 | ... |
| Color Setting | 80 | Count Of Combined Use | 28 | 25 | | 15 | ... |
| | | Frequency | 0.350 | 0.313 | | 0.188 | ... |
| Aggregation | 150 | Count Of Combined Use | 15 | 0 | 15 | | ... |
| | | Frequency | 0.100 | 0.000 | 0.175 | | ... |
| ... | ... | ... | ... | ... | ... | ... | ... |

D2

DISPLAY INPUT DEVICE FOR ADDING AND DISPLAYING A SETTING SCREEN, DISPLAY METHOD FOR A DISPLAY INPUT DEVICE FOR ADDING AND DISPLAYING A SETTING SCREEN, AND IMAGE FORMING APPARATUS

This application is based upon and claims the benefit of priority from the corresponding Japanese Patent Application No. 2010-191486 filed on Aug. 27, 2010, the entire contents of which are incorporated herein by reference.

BACKGROUND OF THE INVENTION

1. Field of the Invention

The present invention relates to a display input device including a display portion and an input portion such as a touch panel. The present invention also relates to an image forming apparatus including the display input device, such as a copier, a multifunction peripheral, a printer, or a fax machine.

2. Description of Related Art

For example, in order to obtain a desired printed material, a user makes various settings on a display input device (for example, operation panel) of an image forming apparatus. Meanwhile, recent image forming apparatuses come installed with a large number of functions. Accordingly, a setting procedure tends to become complicated. However, it is desired that setting input to the display input device be user-friendly and be performed in a simple, smooth manner. In regard to such simplification of the setting input, there is known a bookbinding processing apparatus that facilitates the setting of each item of a post-processing apparatus.

This publicly-known bookbinding processing apparatus is capable of setting a setting value for each item of a post-processing function for printed sheets and includes: a display unit configured to display each operation screen for inputting a setting value of each item of the post-processing function; an input unit configured to be operable to input the setting value of each item using each operation screen; an instruction unit configured to, when inputting a setting value of a first item, give an instruction to display recommended setting values for the first item and subsequent items; a unit configured to display a list of recommended setting values for the first item and subsequent items input on the operation screen, according to the instruction from the instruction unit; a unit configured to validate a recommended setting value selected on the displayed list of the recommended setting values and other item setting values previously input through an operation screen, and to start printing; and a unit configured to validate the recommended setting value selected on the displayed list of the recommended setting values, return to the operating screen for the first item, and receive inputs input through the input unit.

Now, if a plurality of setting items, such as frequently-used setting items, are selected in advance, and a combination of those setting items is registered as one program, it is possible to simplify the task of inputting settings. For example, when the program is invoked, setting screens for the setting items selected in advance are sequentially displayed. With this configuration, it is possible to spare time and effort required in selecting a desired setting item from among a multitude of setting items. In addition, the setting value can be set arbitrarily in a series of the flow, thereby resulting in flexible setting.

By invoking the program, the setting input can be performed smoothly. However, in some cases, the setting items included in the program alone do not suffice to obtain a result (for example, printed material through copying) desired by the user. Accordingly, when the program is used, a job may be executed with the setting contents that lead to an unintended (undesired) result for the user. Further, it is not always the case that the user has developed a mastery of the operation. Thus, the user sometimes does not know what setting item is further required and how to set the setting item. For those reasons, there occurs a problem that when the program is used, an unintended result is obtained for the user, such as outputting an unnecessary printed material. The outputting of an unintended printed material is waste of time, resource, and energy.

The publicly-known bookbinding processing apparatus is configured to display the recommended setting values so as to spare time and effort and to prevent an erroneous input of the setting value. However, the image forming apparatus (for example, multifunction peripheral) is installed with a wide variety of functions, and thus the user does not always understand all the functions. In addition, the displayed recommended setting value is not always such a setting value that helps produce a result intended by the user. Further, when the user desires to obtain his/her intended result, no recommendation is made about a setting item further required. Hence, even if the recommended setting values are displayed, and a selection is made therefrom as in the publicly-known bookbinding processing apparatus, a printed material that is not intended by the user may be created. Hence, the publicly-known bookbinding processing apparatus cannot solve the problem that a result that is not intended by the user may be obtained.

SUMMARY OF THE INVENTION

In view of the above-mentioned problem, the present invention has been made, and therefore has an object to prevent, in an automatic, simplified manner, a result of a job executed by invoking a program and making settings from becoming an unintended result for a user.

In order to solve the above-mentioned problem, a display input device according to Claim 1 of the present invention includes: a display portion for displaying a plurality of kinds of executable functions as setting items, and displaying setting screens for the setting items; a storage portion for storing: a program, which is a combination of setting items selected and registered in advance from among a plurality of the setting items, and is invoked to cause the display portion to sequentially display the setting screen for each of the setting items selected and registered in advance; and data for additional display, which is used for determining for which setting item the setting screen is to be additionally displayed when performing the additional display in which the setting screen for the setting item is added to the program and the display portion is caused to display the added setting screen; an input portion for receiving: a selection of the setting item and an input with respect to the setting screen; when the program is created and registered, an input made to select the setting item that is to be included in the program; and an input made to invoke the registered program; and a processing portion for determining, when the registered program is invoked, an additional setting item, which is the setting item to be additionally displayed, based on the data for additional display, and causing the display portion to additionally display the additional setting item.

According to the present invention, provided is a display input device, a display method for a display input device, and an image forming apparatus capable of preventing, in an automatic, simplified manner, a result of a job executed by invoking a program and making settings from becoming an unintended result for a user.

Further features and advantages of the present invention will become apparent from the description of embodiments given below.

BRIEF DESCRIPTION OF THE DRAWINGS

FIG. 3 is a block diagram illustrating an example of a hardware configuration of the multifunction peripheral.

FIGS. 6A to 6C are explanatory diagrams each illustrating an example of a setting screen related to copying.

FIG. 15 is an explanatory diagram illustrating another example of the data for additional display.

DETAILED DESCRIPTION OF PREFERRED EMBODIMENTS

Hereinbelow, embodiments of the present invention are described with reference to FIGS. 1 to 16. Here, the present invention is applicable to various display input devices, but description is given by taking as an example an operation panel 1 (corresponding to a display input device) included in a multifunction peripheral 100 (corresponding to an image forming apparatus). Note that, such elements as configuration and layout described in this embodiment are provided merely by way of example, and not by way of limiting the scope of the present invention.

(Outline of Image Forming Apparatus)

Figure 1:
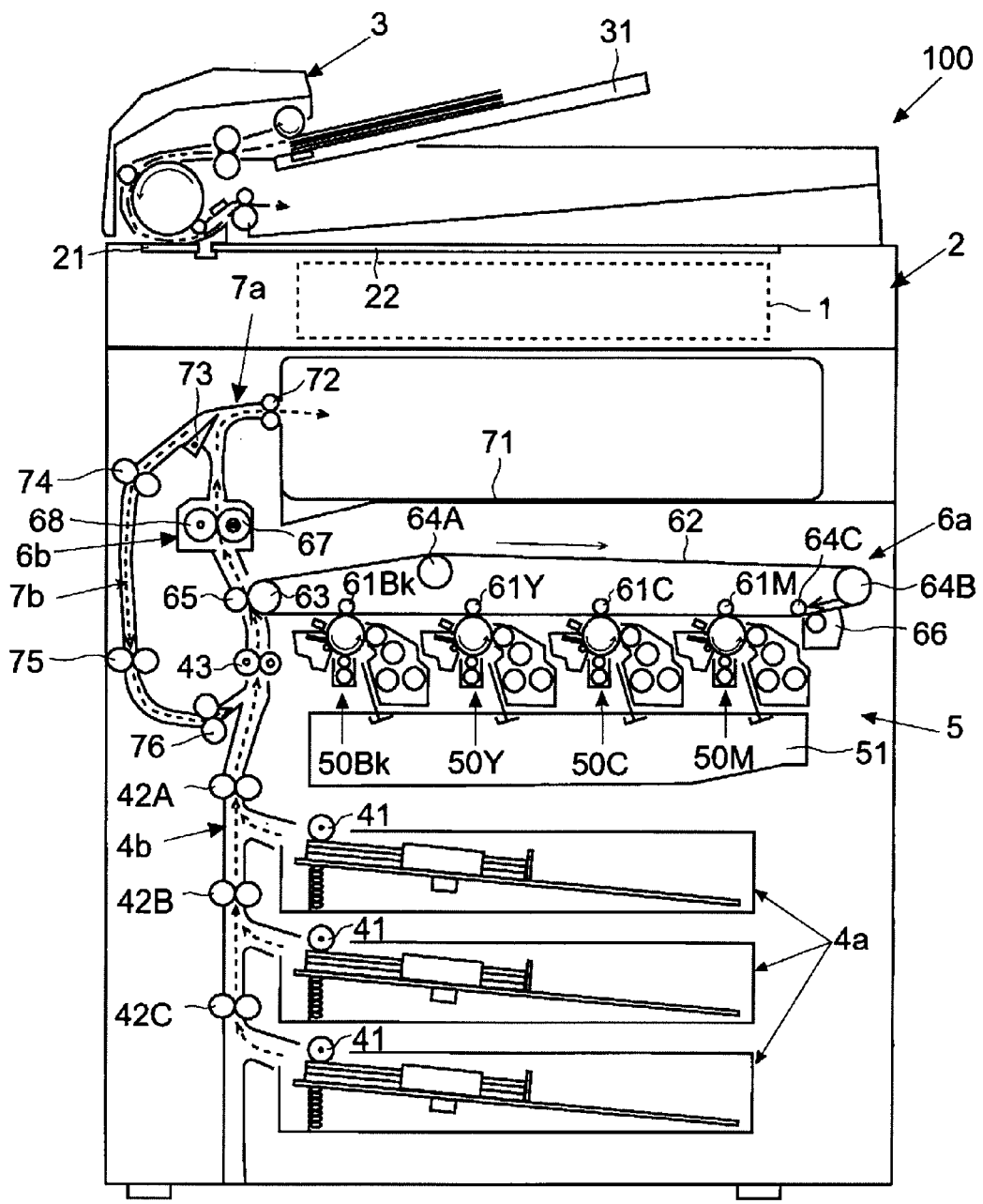
FIG. 1 is a sectional front view schematically illustrating an example of a multifunction peripheral.

First, referring to FIG. 1, an outline of the multifunction peripheral 100 according to an embodiment of the present invention is described. FIG. 1 is a sectional front view schematically illustrating an example of the multifunction peripheral 100.

As illustrated in FIG. 1, the operation panel 1 used for making various settings regarding the multifunction peripheral 100 is provided on a front side of the multifunction peripheral 100 (details thereof are described later). Further, as illustrated in FIG. 1, the multifunction peripheral 100 of this embodiment includes, in an upper portion thereof, an image reading portion 2 and a document conveying device 3, and also includes, in an inside thereof, sheet feeding portions 4a, a conveyance path 4b, an image forming portion 5, an intermediate transfer portion 6a, a fixing portion 6b, a delivery conveyance portion 7a, a duplex conveyance path 7b, and the like.

The document conveying device 3 includes a document tray 31 on which documents to be read are placed. Then, the document conveying device 3 automatically conveys the documents continuously one by one from the document tray 31 to a reading position (contact glass 21 for feed reading). Further, the document conveying device 3 is mounted to the image reading portion 2 so as to be openable/closable in a vertical direction with a depth-direction side of the document conveying device 3 in the drawing sheet of FIG. 1 as a point of support. Further, the document conveying device 3 functions as a cover that presses, from above, contact glasses (the contact glass 21 for feed reading and a contact glass 22 for placement reading) of the image reading portion 2.

Next, as illustrated in FIG. 1, the image reading portion 2 includes, in a top surface thereof, the contact glass 21 for feed reading and the contact glass 22 for placement reading, on which a document is placed when such a document as a book is read one sheet by one sheet. In the image reading portion 2, a lamp, a mirror, a lens, an image sensor, etc. (not shown) are disposed. Based on light reflected from a document passing by the contact glass 21 for feed reading or light reflected from a document placed on the contact glass 22 for placement reading, the image sensor reads the document. Then, the image sensor converts the reflected light to an analog electrical signal in accordance with an image density. Then, the image reading portion 2 performs quantization, thereby obtaining image data on the document. Note that, the image reading portion 2 of this embodiment is capable of both color reading and black-and-white reading.

The plurality of the sheet feeding portions 4a inside a main body of the multifunction peripheral 100 respectively accommodate a plurality of sheets of various sizes (for example, letter size, the A series paper such as A4, the B series paper such as B4, etc.) and of various types (for example, copy paper, recycled paper, cardboard, OHP sheets, etc.). Each of the sheet feeding portions 4a is provided with a sheet feeding roller 41 configured to be driven rotationally, and, at the time of printing, any one of the sheet feeding rollers 41 rotates to feed sheets one by one to the conveyance path 4b.

The conveyance path 4b is a path for conveying a sheet supplied from the sheet feeding portion 4a inside the apparatus. Further, the conveyance path 4b is provided with a guide for guiding sheets. Further, the conveyance path 4b is provided with conveying roller pairs 42 (in FIG. 1, from the top, a total of three 42A, 42B, and 42C) that are rotationally driven when a sheet is conveyed. Further, the conveyance path 4b is provided with a registration roller pair 43 for holding a conveyed sheet in front of the image forming portion 5 and feeding the sheet in synchronization with a timing at which a formed toner image is transferred.

The image forming portion 5 includes a plurality of image forming units 50 (50Bk for black, 50Y for yellow, 50C for cyan, and 50M for magenta) and an exposure device 51. Based on image data obtained through reading by the image reading portion 2, image data stored in a storage device 82 described later, or such other data, the exposure device 51 outputs a laser beam while turning ON/OFF the laser beam, to thereby subject each photosensitive drum to scanning exposure. The image forming units 50 each include the photosensitive drum supported so as to be rotationally driven, and a charging device, a developing device, a cleaning device, and the like which are arranged around the photosensitive drum. Then, by means of each image forming unit 50 and the exposure device 51, a toner image is formed on an outer periphery of the photosensitive drum.

The intermediate transfer portion 6a is subjected to a primary transfer of a toner image from each image forming unit 50, and then secondarily transfers the toner image onto a sheet. The intermediate transfer portion 6a includes primary transfer rollers 61Bk to 61M, an intermediate transfer belt 62, a drive roller 63, a plurality of driven rollers 64 (64A to 64C), a secondary transfer roller 65, a belt cleaning device 66, and the like. The intermediate transfer belt 62 is stretched around the drive roller 63 and the like. The respective primary transfer rollers 61Bk to 61M sandwich the endless intermediate transfer belt 62 with the corresponding photosensitive drums. Each of the primary transfer rollers 61Bk to 61M is applied with transfer voltage, and the toner image is transferred onto the intermediate transfer belt 62 from the photosensitive drum.

The intermediate transfer belt 62 is rotated by the rotational driving of the drive roller 63 connected to a driving mechanism such as a motor (not shown). Further, the drive roller 63 sandwiches the intermediate transfer belt 62 with the secondary transfer roller 65. The toner images (having respective colors of black, yellow, cyan, and magenta) formed by the respective image forming units 50 are sequentially superimposed with no misregistration, and the resultant image is primarily transferred onto the intermediate transfer belt 62. After that, the toner image is transferred onto a sheet by the secondary transfer roller 65 applied with a predetermined voltage.

The fixing portion 6b fixes the toner image that has been transferred onto the sheet. The fixing portion 6b is mainly configured by a heating roller 67 embedded with a heating element and a pressure roller 68 that is brought into pressure contact with the heating roller 67. Then, when the sheet passes through a nip portion formed by the heating roller 67 and the pressure roller 68, the toner is heated/fused. As a result, the toner image is fixed on the sheet. The sheet delivered from the fixing portion 6b is conveyed in a direction toward a delivery tray 71.

The delivery conveyance portion 7a sorts, regarding the sheet conveying direction, the printed sheet in the direction toward the delivery tray 71 or in a direction toward the duplex conveyance path 7b. The delivery conveyance portion 7a is provided with a delivery roller pair 72 that conveys a sheet in the direction toward the delivery tray 71 by being rotationally driven in a normal direction of the rotation, or performs switchback for duplex print by rotating in a reverse direction. Further, the delivery conveyance portion 7a includes a switchover valve 73 for switching the sheet conveying directions. The switchover valve 73 is configured to pivot. The switchover valve 73 is at the basic position when the duplex conveyance path 7b is closed to guide a sheet in the direction toward the delivery tray 71, and at the time of duplex print, the switchover valve 73 pivots to guide, to the duplex conveyance path 7b, a switchbacked sheet whose one side is already printed. The duplex conveyance path 7b connects a downstream side of the fixing portion 6b and an upstream side of the registration roller pair 43. The duplex conveyance path 7b is provided with a plurality of duplex conveyance roller pairs 74 to 76 that are rotationally driven for duplex print, to thereby convey a sheet whose one side is already printed.

(Operation Panel 1)

Figure 2:
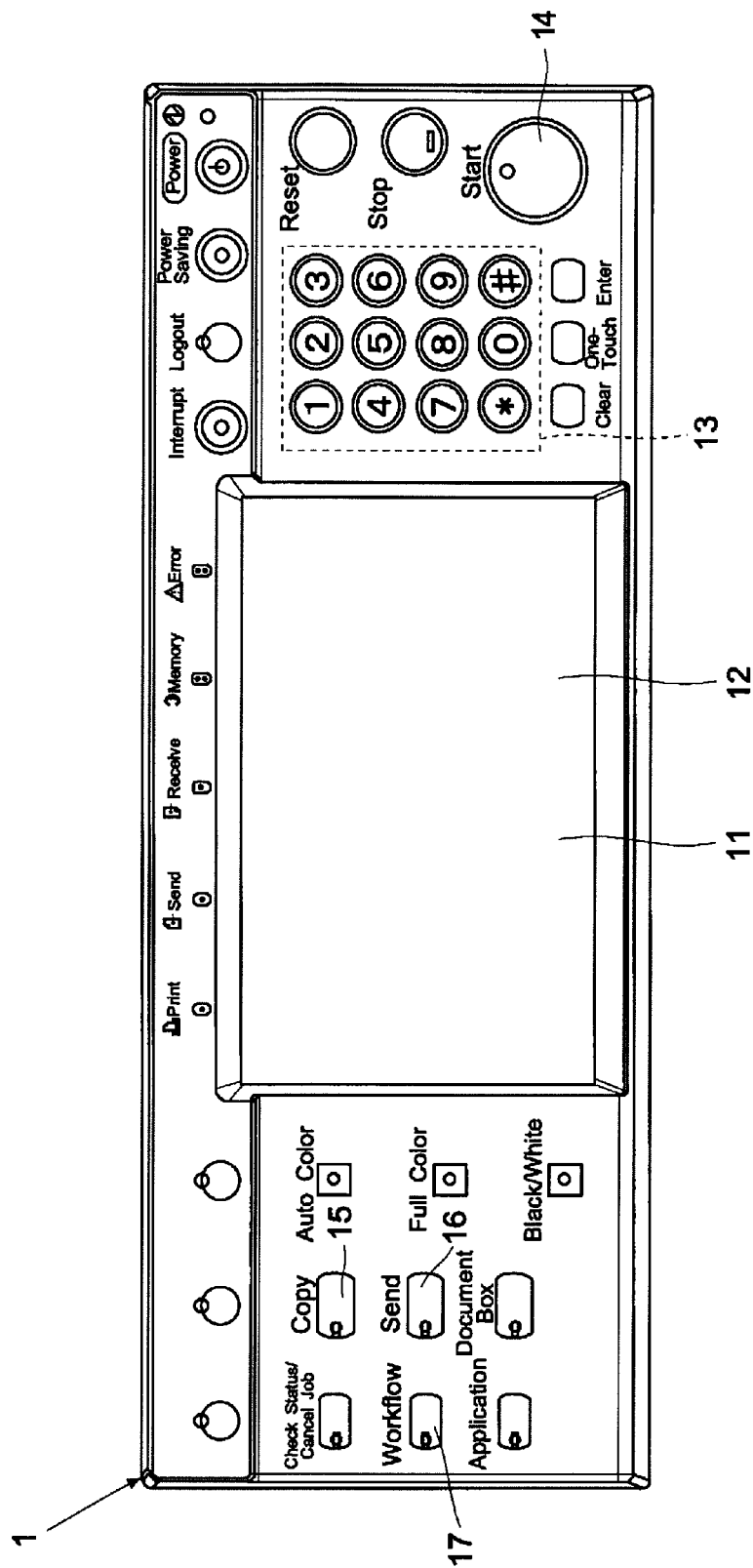
FIG. 2 is a plan view illustrating an example of an operation panel.

Next, referring to FIG. 2, description is given of an example of the operation panel 1 according to the embodiment of the present invention. FIG. 2 is a plan view illustrating an example of the operation panel 1.

As illustrated in FIG. 1, the operation panel 1 is provided in the upper front of the multifunction peripheral 100. The operation panel 1 includes a liquid crystal display portion 11 (corresponding to display portion) for displaying a screen and various images, such as menus and keys used for making settings of the multifunction peripheral 100 and giving operation instructions, and a message regarding the state of the multifunction peripheral 100. A user can press the keys displayed on the liquid crystal display portion 11 to make various settings about a job such as copying for the multifunction peripheral 100.

Further, a touch panel portion 12 (corresponding to input portion) is provided on the top surface of the liquid crystal display portion 11. The touch panel portion 12 is used for detecting the position and coordinates of a part pressed by the user on the liquid crystal display portion 11. By comparing the coordinates detected by the touch panel portion 12 to the positions and coordinates of various keys displayed on the liquid crystal display portion 11, the key selected by the user through pressing is identified. Note that, the touch panel portion 12 is not particularly limited, and thus can employ various types, such as a resistive type, a surface acoustic wave type, an infrared type, and a capacitive type.

Further, the operation panel 1 is provided with the following hard keys (buttons). For example, there are provided a numeric keypad portion 13 (corresponding to the input portion) for inputting numerals, a start key 14 (corresponding to the input portion) for giving an instruction to start such processing as copying after various settings are made, and the like. Further, there are provided, for example, a copy key 15 (corresponding to the input portion) to be pressed when a copy function is used and a send key 16 (corresponding to the input portion) to be pressed when a scanner function or a fax function is used. Further, there is also provided a workflow key 17 (corresponding to the input portion) to be pressed when a workflow is created or registered, or a workflow is invoked (details thereof are described later). As described above, the touch panel portion 12 and the various hard keys which are provided to the operation panel 1 function as the input portion used for making various settings, selecting modes, and performing other operations with regard to respective functions of the multifunction peripheral 100.

(Hardware Configuration of Multifunction Peripheral 100 and the Like)

Next, referring to FIG. 3, description is given of an example of a hardware configuration of the multifunction peripheral 100 according to the embodiment of the present invention. FIG. 3 is a block diagram illustrating an example of the hardware configuration of the multifunction peripheral 100 and the like.

First, a primary control portion 8 is provided inside the main body of the multifunction peripheral 100. For example, the primary control portion 8 is connected to the operation panel 1, the document conveying device 3, the image reading portion 2, the sheet feeding portion 4a, the conveyance path 4b, the image forming portion 5, the fixing portion 6b, the delivery conveyance portion 7a, and the like, and controls those components.

The primary control portion 8 includes, for example, a CPU 81 and other elements. The CPU 81 performs computation or the like in accordance with a control program, which is stored in a storage device 82 (corresponding to storage portion) and is to be loaded therefrom, thereby controlling respective portions of the multifunction peripheral 100. Note that, as the primary control portion 8, a plurality of kinds of control portions may be provided depending on the function. For example, such control portions may include a main control portion that performs overall control and image processing, and an engine control portion that controls printing by, for example, performing image formation and turning ON/OFF motors or the like that cause various rotational bodies to rotate.

The storage device 82 is connected to the primary control portion 8. The storage device 82 is configured by combining non-volatile and volatile storage devices such as a ROM, a RAM, a HDD, and the like. The storage device 82 can store various pieces of data, including a control program, control data, and setting data of the multifunction peripheral 100, and image data. In particular, the storage device 82 can store a created workflow (corresponding to program). Note that, the workflow refers to a combination of setting items, which are selected and registered in advance from among a plurality of setting items, and also to a program for causing the display portion to display a screen for setting the setting items selected and registered in advance by invoking the workflow.

Further, the primary control portion 8 is connected to an interface portion (hereinafter, referred to as I/F portion 83) provided with various connectors, a socket, a fax modem, and the like. The I/F portion 83 is connected to a plurality of external computers 200 (for example, personal computers) and to a communication partner's fax machine 300 (in FIG. 3, only one external computer 200 and one fax machine 300 are illustrated for the sake of convenience) via a network, a public line, or the like. For example, image data obtained by the image reading portion 2 can be stored in the storage device 82, or the image data can be transmitted to the external computer 200 or the communication partner's fax machine 300 (the scanner function and the fax function). Further, it is also possible to perform printing, fax transmission, and the like based on image data that has been input to the multifunction peripheral 100 through the transmission from the external computer 200 or the communication partner's fax machine 300 (the printer function and the fax function).

Further, for example, the primary control portion 8 includes an image processing portion 84. The image processing portion 84 performs image processing on image data obtained by reading a document by the image reading portion 2 or on image data input to the multifunction peripheral 100 via the I/F portion 83. For example, image data processed by the image processing portion 84 is transmitted to the exposure device 51, which then uses the image data when subjecting the photosensitive drum to scanning/exposure.

Further, the primary control portion 8 recognizes an input made to the operation panel 1, and controls the multifunction peripheral 100 to perform a job such as copying or transmission in accordance with the settings made by the user. The operation panel 1 of this embodiment includes a display control portion 10 (corresponding to a processing portion), a memory 18 (corresponding to a storage portion), a driver circuit 19, a liquid crystal display portion 11, and a touch panel portion 12.

The display control portion 10 is constituted by a CPU, an IC, and the like, and controls displaying of the liquid crystal display portion 11. Then, the display control portion 10 receives an output from the touch panel portion 12, to thereby identify the position (coordinates) at which the liquid crystal display portion 11 is pressed. The memory 18 stores data such as a table indicating a correspondence between the output from the touch panel portion 12 and the coordinates. The display control portion 10 compares the coordinates of a pressed position and image data of a corresponding setting screen 9 to each other, to thereby identify and recognize a key selected (pressed) on the setting screen 9.

In a normal operation, in order to select a setting item and set a setting value for each function of the multifunction peripheral 100, selecting a key displayed on the liquid crystal display portion 11 is repeated from a topmost layer of the liquid crystal display portion 11. Then, every time a key is selected, the display control portion 10 causes the liquid crystal display portion 11 to switch its display. Then, eventually, the setting value is set for the function that the user intends to select and set. The display control portion 10 recognizes that this function has been selected and set. The display control portion 10 transmits a content thereof to the primary control portion 8 in the main body. By doing so, the primary control portion 8 causes the respective portions, such as the image forming portion 5, to perform an operation that reflects the function selected and set via the operation panel 1. Thus, the intention of the user is reflected in printing and the like (for example, density setting, enlargement/reduction, etc.).

Further, image data of screens and images to be displayed by the liquid crystal display portion 11 is stored in, for example, the memory 18 of the operation panel 1. Accordingly, every time a key is pressed in a selection screen 9A for the setting item or each setting screen 9, the display control portion 10 reads image data of a screen to be displayed next from the memory 18. In particular, the memory 18 can store a created workflow (corresponding to a program).

Alternatively, the image data of screens and images to be displayed by the liquid crystal display portion 11 may be stored in, for example, the storage device 82 on the main body side. In this case, the operation panel 1 receives the image data that is to be used for a display by the liquid crystal display portion 11 from the storage device 82 via the primary control portion 8. Upon receiving the image data, the display control portion 10 gives an instruction to the driver circuit 19 that actually controls displaying of the liquid crystal screen. Note that, the display control portion 10 and the memory 18 do not need to be provided to the operation panel 1, and instead, it is possible to cause the CPU 81 of the primary control portion 8 and the storage device 82 to control the operation panel 1 so as to be used for the functions of the display control portion 10 and the memory 18.

(Creation and Registration of Workflow)

Next, referring to FIGS. 4A, 4B, 5, 6A, 6B, 6C, 7, and 8, description is given of an outline of creation and registration of a workflow performed in the multifunction peripheral 100.

First, the multifunction peripheral 100 of this embodiment has a multitude of settable functions and a variety of setting items. The liquid crystal display portion 11 displays the selection screen 9A for selecting, from among the plurality of setting items, a setting item for which settings are to be made. The user selects (presses) a setting item (function) to be used in printing or transmission. For example, the liquid crystal display portion 11 displays each setting item as a key. Further, the liquid crystal display portion 11 displays the setting screen 9 for the selected setting item. The user can select various kinds of functions and make various kinds of settings by pressing, for example, keys displayed on each setting screen 9 or hard keys arranged around the liquid crystal display portion 11. Note that, there are so many kinds of setting items and setting screens 9 therefor, and thus, for the sake of convenience, illustration and description thereof are herein omitted except when described later as an example.

Here, certain setting items are used in combination frequently when the user uses the multifunction peripheral 100. Examples of such a case include a combination of setting items of density setting and poster print for the purpose of creating a poster, a combination of aggregate print and duplex print for the purpose of suppressing sheet consumption, and a combination of a transmission method and a transmission destination of image data obtained through reading by the image reading portion 2. However, the multifunction peripheral 100 has a variety of setting items (functions), and thus it is bothersome and inconvenient to perform the same setting every time the multifunction peripheral 100 is used.

To address this, in the multifunction peripheral 100 of this embodiment, a frequently-used combination of setting items can be selected and created in advance, and the combination of the setting items can be stored as a workflow (corresponding to a program) (details thereof are described later). Then, the user invokes the workflow (program containing data indicating setting items selected in advance, display order, and display format) stored in the storage device 82 or the memory 18. In this manner, the liquid crystal display portion 11 displays screens for setting the selected setting items.

Next, specific description is given of an example of creating and registering a workflow by using the operation panel 1. For example, when the workflow key 17 is pressed, the display control portion 10 causes the liquid crystal display portion 11 to display an invocation screen 9D (see FIG. 9) for invoking a workflow. When a registration/edit key K29 is pressed on the invocation screen 9D, the display control portion 10 receives an input for creating and registering a workflow via the touch panel portion 12 or the like (new registration of workflow). For example, the display control portion 10 of the operation panel 1 receives and recognizes an input specifying a setting item to be included in a workflow that is to be created.

[Selection of Setting Item]

Figure 4A:
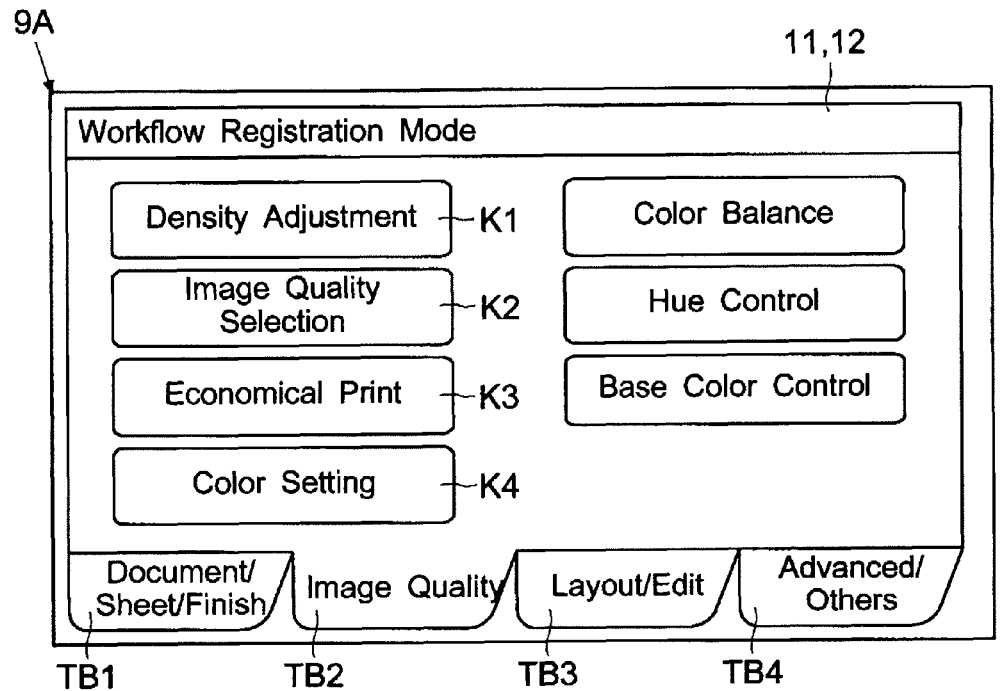
FIGS. 4A and 4B are explanatory diagrams each illustrating an example of a selection screen for setting items related to copying.
Figure 4B:
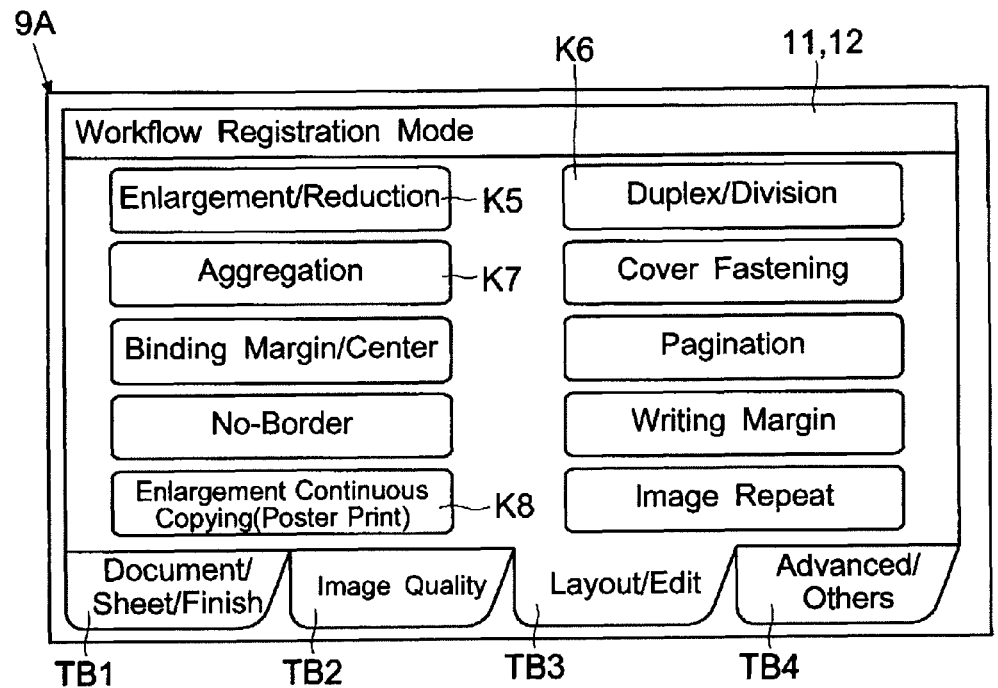
Figure 5:
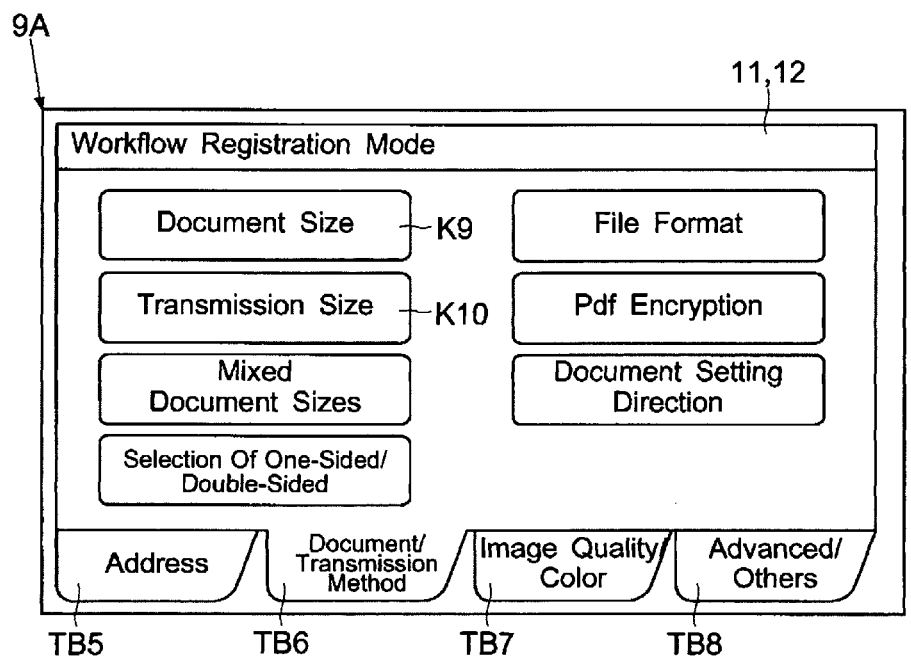
FIG. 5 is an explanatory diagram illustrating an example of a selection screen for setting items related to transmission.

Here, referring to FIGS. 4A, 4B, and 5, description is given of an example of selecting a setting item to be included in a workflow. FIGS. 4A and 4B are explanatory diagrams each illustrating an example of the selection screen 9A for setting items related to copying. FIG. 5 is an explanatory diagram illustrating an example of the selection screen 9A for setting items related to transmission.

First, referring to FIGS. 4A and 4B, description is given of selection of a setting item performed when a workflow related to copying is created. For example, in the case of creating a workflow (after the registration/edit key K29 is pressed), when the copy key 15 is pressed, the display control portion 10 causes the liquid crystal display portion 11 to display the selection screen 9A for setting items related to the copy function as illustrated in FIGS. 4A and 4B. The liquid crystal display portion 11 displays a plurality of tabs, such as a document/sheet/finish tab TB1, an image quality tab TB2, a layout/edit tab TB3, and an advanced/others tab TB4, in the selection screen 9A. Note that, more kinds of tabs may be provided.

For example, when the image quality tab TB2 is pressed, as illustrated in FIG. 4A, the display control portion 10 causes the liquid crystal display portion 11 to display the setting items related to the image quality of copying. The setting items are arranged as keys. For example, when the image quality tab TB2 is pressed, the liquid crystal display portion 11 displays: a density adjustment key K1 for manually adjusting the density of a printed material; an image quality selection key K2 for setting the image quality of a document (text only, image only, image+text, etc.); an economical print key K3 for setting whether or not printing is to be performed in such a manner as to save toner at the expense of the image quality; a color setting key K4 for setting color (full color, black and white, single-color, two-color, etc.) to be used for copying (printing); and other keys. Note that, the keys for other setting items are also assigned functions, but description thereof is herein omitted.

Further, for example, when the layout/edit tab TB3 is pressed, as illustrated in FIG. 4B, the display control portion 10 causes the liquid crystal display portion 11 to display setting items related to the layout and editing of a page or an image at the time of copying. In this selection screen 9A, too, the respective setting items are arranged as keys. For example, when the layout/edit tab TB3 is pressed, the liquid crystal display portion 11 displays: an enlargement/reduction key K5 for setting the scaling of an image, such as enlargement and reduction; a duplex/division key K6 for setting duplex print or division print in which each page of a duplex-printed document or a double-page printed document is printed in a divided manner; an aggregation key K7 for making settings regarding such copying that a plurality of pages of a document are printed in one page; a poster key K8 for making settings regarding poster print in which a document is enlarged beyond the maximum sheet size available for the multifunction peripheral 100 (for example, A3 size), and a copy is made for the enlarged image in a plurality of sheets in a divided manner; and other keys (although the keys for other setting items are also assigned functions, description thereof is herein omitted).

Further, though not illustrated, when the document/sheet/finish tab TB1 is pressed, the display control portion 10 causes the liquid crystal display portion 11 to display keys corresponding to setting items related to the document, the sheet, and the finish (document setting direction, staple, etc.). Further, when the advanced/others tab TB4 is pressed, the display control portion 10 causes the liquid crystal display portion 11 to display advanced setting items related to copying (for example, mirror image print and printing with black and white reversed) as keys.

Next, referring to FIG. 5, description is given of selection of a setting item performed when a workflow related to transmission is created. As illustrated in FIG. 5, in the case of creating a workflow (after the registration/edit key K29 is pressed), when the send key 16 is pressed, the display control portion 10 causes the liquid crystal display portion 11 to display the selection screen 9A (see FIG. 5) for setting items related to the function of transmitting image data obtained by reading a document, such as FAX or scan.

For example, as illustrated in FIG. 5, the liquid crystal display portion 11 displays a plurality of tabs, such as an address tab TB5, a document/transmission method tab TB6, a color/image quality tab TB7, and an advanced/others tab TB8, in the selection screen 9A for transmission. Note that, more kinds of tabs may be provided.

For example, as for the transmission, too, respective setting items are arranged as keys. As illustrated in FIG. 5, when the document/transmission method tab TB6 is pressed, the display control portion 10 causes the liquid crystal display portion 11 to display setting items related to a document to be read and the transmission method for image data. Then, the liquid crystal display portion 11 displays: a document size key K9 for setting the size of a document to be read; a transmission size key K10 for setting the size of image data to be transmitted; and other keys (although the keys for other setting items are also assigned functions, description thereof is herein omitted).

After a setting item is set on such a selection screen 9A, the display control portion 10 causes the liquid crystal display portion 11 to display the setting screen 9 prepared for setting a setting value in the selected setting item. Then, the display control portion 10 recognizes the setting value (key indicating the pressed setting value) set on the setting screen 9 as a default setting value for the workflow.

[Setting of Setting Value]

Figures 6A, 6B, 6C:
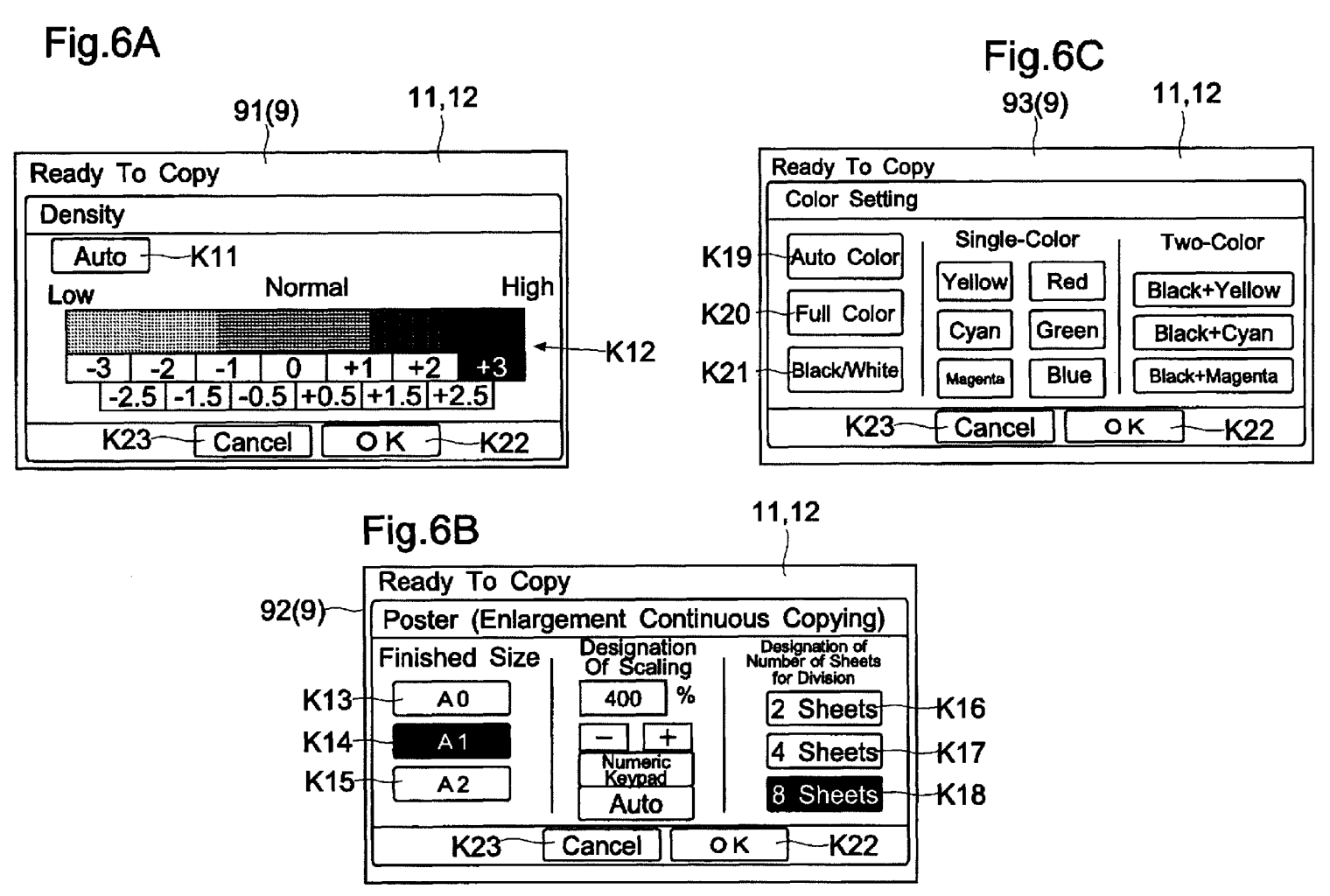

Here, referring to FIGS. 6A to 6C, description is given of an example of setting a setting value for a setting item to be included in a workflow. FIGS. 6A to 6C are explanatory diagrams each illustrating an example of the setting screen 9 related to copying.

For example, FIG. 6A illustrates an example of a setting screen 91 for the setting item of density adjustment. FIG. 6B illustrates an example of a setting screen 92 for the setting item of poster print (enlargement continuous copying). FIG. 6C illustrates an example of a setting screen 93 for the setting item of color setting. As described above, the setting screen 9 is prepared for each setting item (illustration is herein omitted for other setting items).

For example, the setting screen 91 of FIG. 6A is displayed, for example, when the density adjustment key K1 is pressed (when the setting item of density adjustment is selected). On the setting screen 91 of density adjustment, the liquid crystal display portion 11 displays an "auto" key K11 for automatically setting the density based on the image data of a read document. Further, the liquid crystal display portion 11 displays a density level key K12 provided with the numeral "0" and numerals with the positive or negative sign for manually setting the finished density of a printed material. Note that, when a larger numeral of the density level key K12 is pressed, the density of a printed material becomes higher.

Further, the setting screen 92 of FIG. 6B is displayed, for example, when the poster key K8 is pressed (when the setting item of poster print (enlargement continuous copying) is selected). On the setting screen 92 of poster print, the liquid crystal display portion 11 displays an A0 key K13 (corresponding to A0 paper), an A1 key K14 (corresponding to A1 paper), and an A2 key K15 (corresponding to A2 paper) for setting the finished size (size obtained when a plurality of pages are combined). Further, the liquid crystal display portion 11 also displays a key for setting the scaling for enlargement, and other keys. Note that, instead of the A-type paper, there may be prepared keys based on the inch, such as four times (17 inches×22 inches) the size of the letter size (8.5 inches×11 inches), eight times (22 inches×34 inches), and sixteen times (44 inches×34 inches).

Further, the liquid crystal display portion 11 also displays a two-sheet key K16 (dividing the image into two sheets), a four-sheet key K17 (dividing the image into four sheets), and an eight-sheet key K18 (dividing the image into eight sheets) for making a setting as to how many sheets are used when the enlarged image is divided for printing.

Further, the setting screen 93 of FIG. 6C is displayed, for example, when the color setting key K4 is pressed (when the setting item of color setting is selected). On the setting screen 93 of color setting, the liquid crystal display portion 11 displays, based on a color pattern of the image data obtained through the reading of a document by the image reading portion, an auto color key K19 that is pressed when the color for printing is automatically set, a full-color key K20 that is pressed when printing is performed using all toner colors, and a black and white key K21 that is pressed when black and white printing is performed using a black toner alone. In addition, in the multifunction peripheral 100 of this embodiment, it is possible to perform printing by using only a toner of one color or toners of two colors, and there are displayed a plurality of keys that are pressed when printing is performed with a single color or two colors.

The display control portion 10 causes a key pressed on each setting screen 9 to be displayed in a black-and-white reversed manner (the same applies hereinafter). Further, the display control portion 10 causes each setting screen 9 (91 to 93) to display, for example, an OK key K22 and a cancel key K23 on the liquid crystal display portion 11. When the OK key K22 is pressed, the selected (pressed) setting value is set as a default setting value for the workflow (for example, in FIG. 6A, printing at the maximum density is set as the default setting value).

In this manner, the user selects a setting item to be included in the workflow and sets a default setting value as needed. Then, the display control portion 10 checks whether or not an input that gives an instruction to end the selection of a setting item to be included in the workflow has been received. For example, a plurality of kinds of inputs may be used to give an instruction to end the selection of a setting item to be included in the workflow. For example, such inputs may be determined arbitrarily, including the depression of the start key 14, the depression of the workflow key 17, and the like. Further, every time the OK key K22 is pressed, the display control portion 10 may cause the liquid crystal display portion 11 to display a confirmation screen for asking the user whether or not to end the selection of a setting item.

Figure 7:
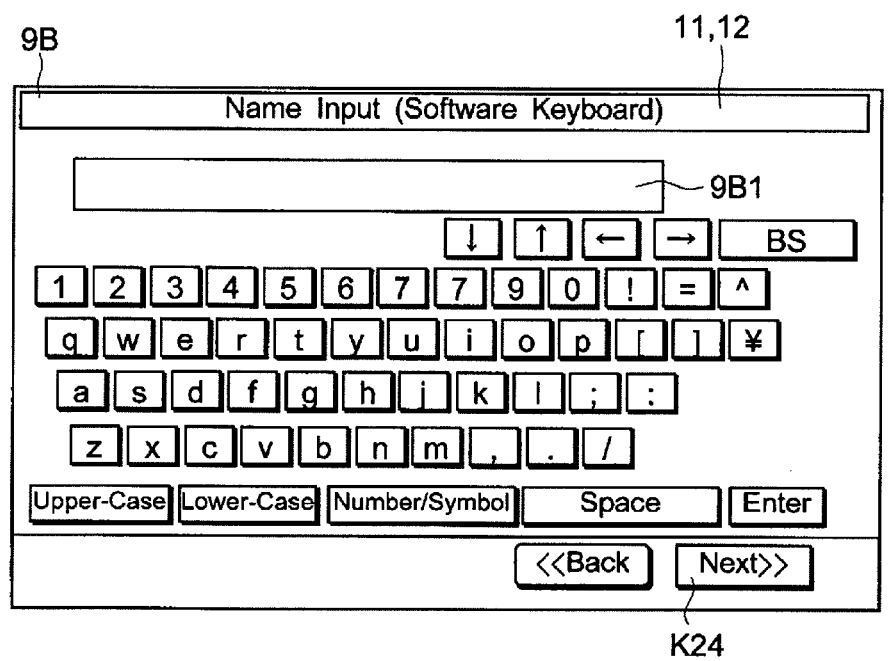
FIG. 7 is an explanatory diagram illustrating an example of a name input screen for a created workflow.

After the selection of a setting item to be included in the workflow is ended, the display control portion 10 causes a name input screen 9B for the workflow to be displayed on the liquid crystal display portion 11 as illustrated in FIG. 7. FIG. 7 is an explanatory diagram illustrating an example of the name input screen 9B for the created workflow.

For example, the user performs input on a software keyboard in the name input screen 9B, thereby inputting a name of the workflow with the alphabet, numerals, or the like. The display control portion 10 changes displaying of a name display field 9B1 according to the input performed by the user on the software keyboard. Then, for example, the display control portion 10 recognizes, as the name of the workflow currently being created, a content shown in the name display field 9B1 when a "next" key K24 is pressed.

Figure 8:
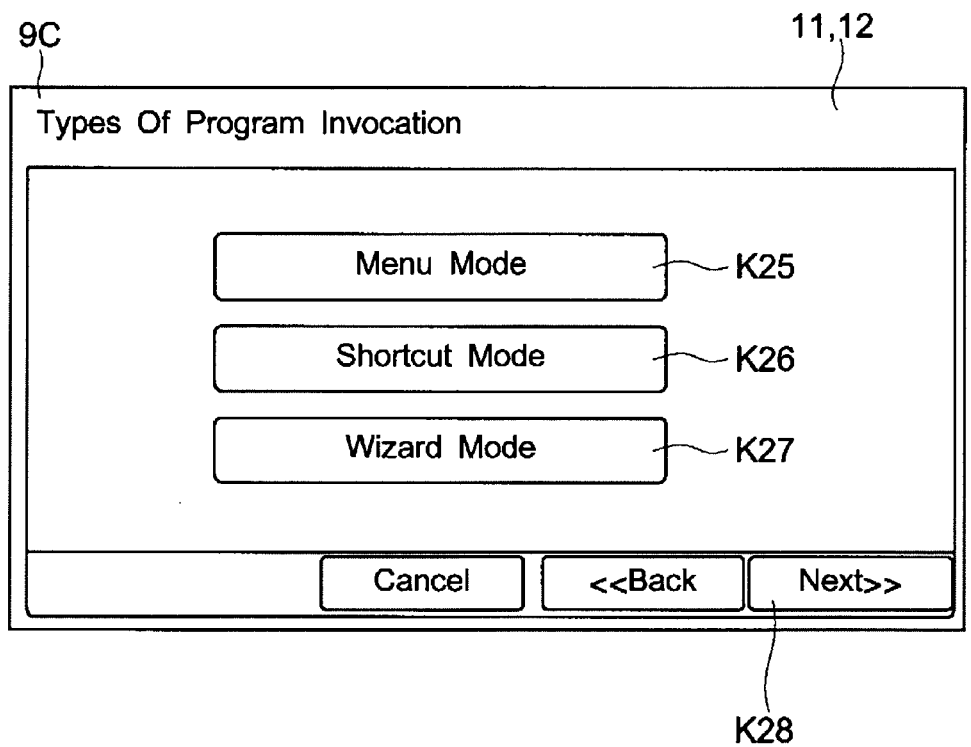
FIG. 8 is an explanatory diagram illustrating an example of a display format determination screen for determining a display format that is to be used when a workflow is invoked.

Moreover, the display control portion 10 causes the liquid crystal display portion 11 to display a display format determination screen 9C for determining a display format that is to be used when the created workflow is invoked. FIG. 8 is an explanatory diagram illustrating an example of a display format determination screen 9C used for setting a display format when a workflow is invoked. The user selects a display format for the workflow on the display format determination screen 9C.

For example, the user presses, on the display format determination screen 9C, any one of a menu mode key K25 (Menu format), a shortcut mode key K26 (list display format), and a wizard mode key K27 (Wizard format). The display control portion 10 recognizes, as the display format of the workflow currently being created, the display format corresponding to the key selected when a "next" key K28 is pressed.

Then, when the "next" key K28 is pressed, the storage device 82 or the memory 18 stores the created workflow. For example, the display control portion 10 or the primary control portion 8 causes the storage device 82 or the memory 18 to store the name of the workflow, the display format, setting items to be included, the display order of the setting items (corresponding to the order in which the setting items are selected at the time of creating the workflow), and the default setting values in the setting items. After that, the operation panel 1 recovers from the workflow registration mode to the normal input mode.

(Invocation and Use of Workflow)

Figure 9:
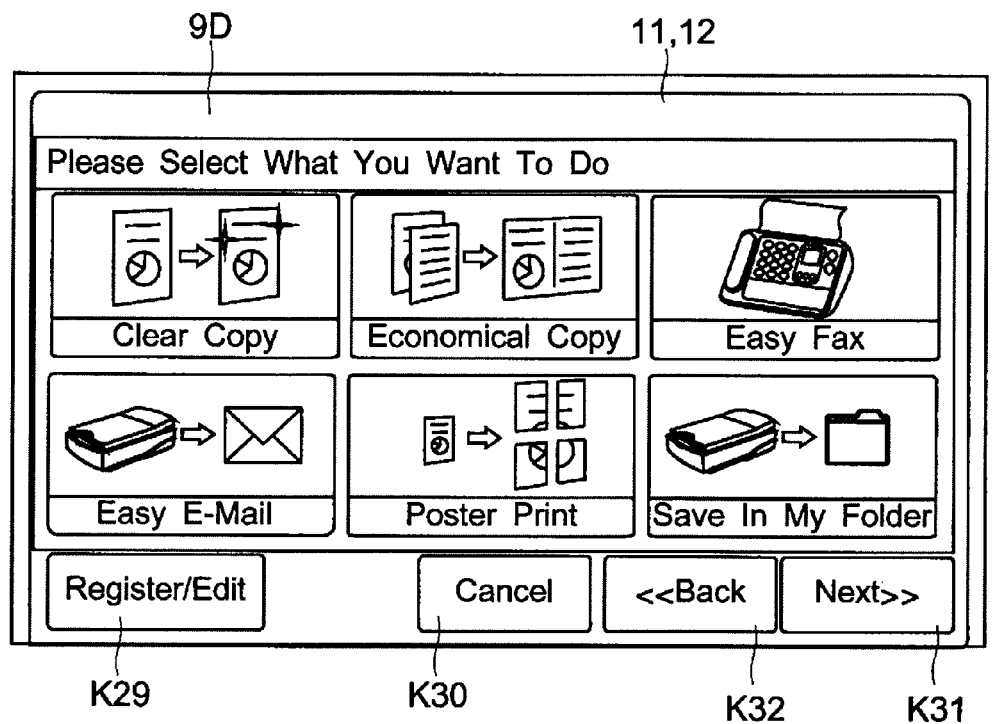
FIG. 9 is an explanatory diagram illustrating an example of an invocation screen displayed at the time of selecting a workflow.
Figure 10:
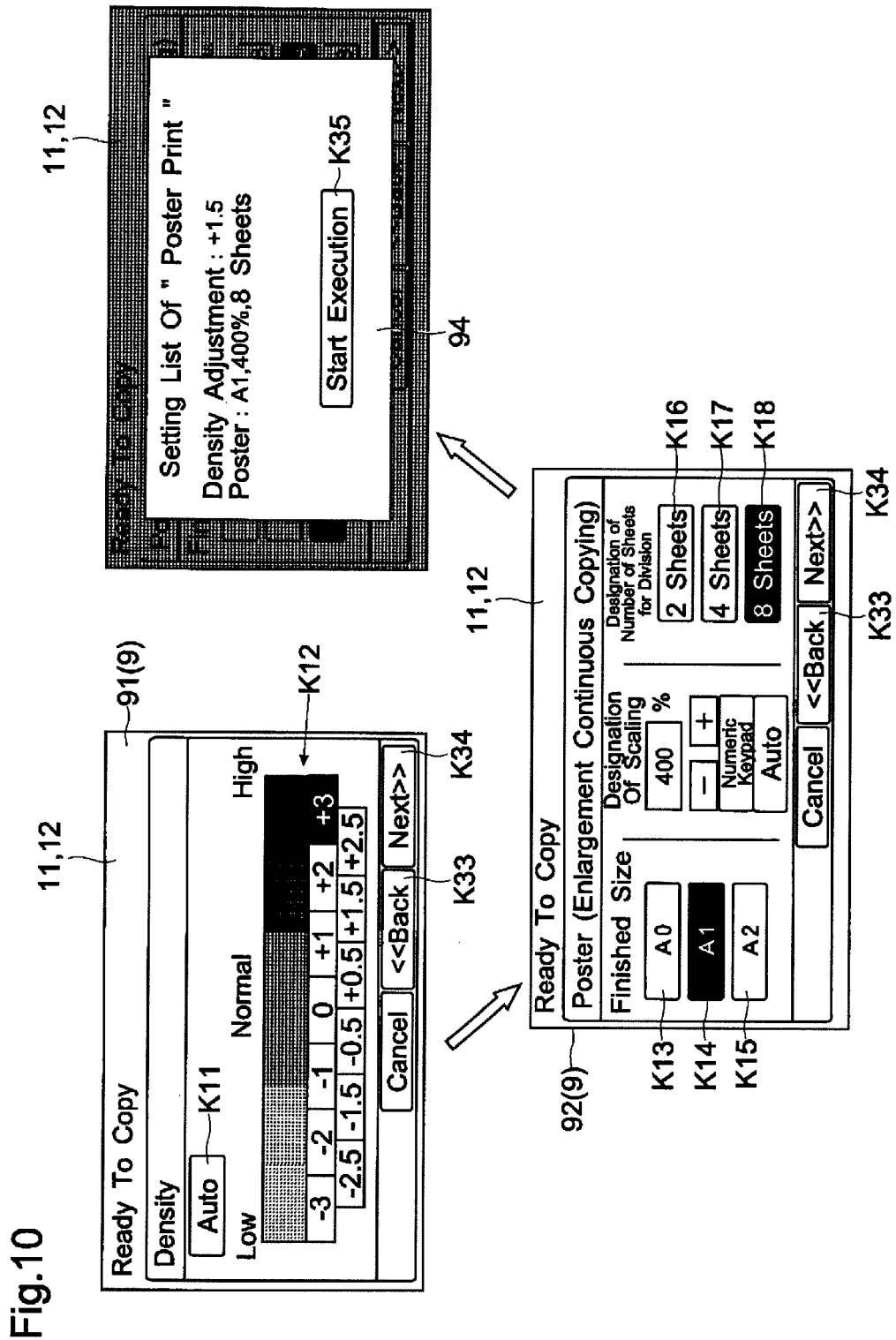
FIG. 10 is an explanatory diagram illustrating an example of a flow used when a workflow is displayed in a Wizard format.
Figure 11:
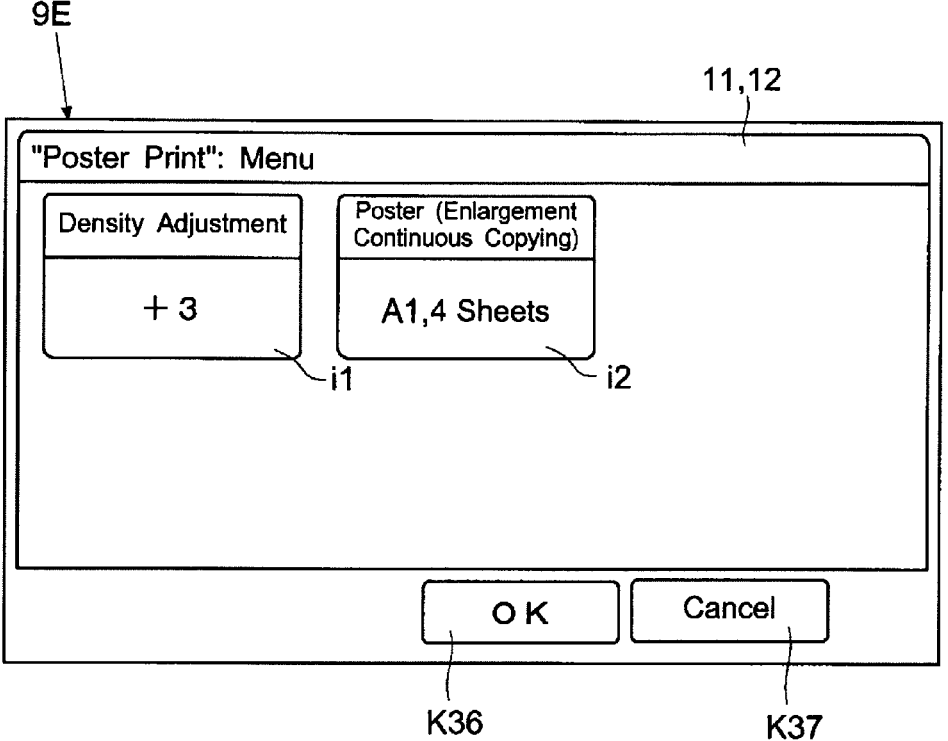
FIG. 11 is an explanatory diagram illustrating an example of a menu screen displayed when a workflow is displayed in a Menu format.

Next, referring to FIGS. 9 to 11, description is given of an example of invoking and using the workflow according to the embodiment. FIG. 9 is an explanatory diagram illustrating an example of the invocation screen 9D displayed at the time of selecting the workflow. FIG. 10 is an explanatory diagram illustrating an example of a flow used when the workflow is displayed in the Wizard format. FIG. 11 is an explanatory diagram illustrating an example of a menu screen 9E displayed when the workflow is displayed in the Menu format.

For example, when the user desires to invoke a workflow registered in advance, the user presses the workflow key 17 (see FIG. 2). Then, as illustrated in FIG. 9, the liquid crystal display portion 11 displays the invocation screen 9D for selecting a workflow to be used (invoked) from among the workflows registered in advance. For example, FIG. 9 illustrates an example in which there are displayed workflows named "clear copy", "economical copy", "easy FAX", "easy e-mail", "poster print", "easy folder", and "save in my folder". When the image indicating each workflow is pressed, the pressed workflow is invoked from the storage device 82 or the memory 18, and the liquid crystal display portion 11 displays screens for making settings according to the workflow.

Note that, in a lower portion of the invocation screen 9D, there is arranged the registration/edit key K29, which is pressed when a workflow is newly created or when an already-registered workflow is edited. In addition, there is arranged a cancel key K30 for stopping invocation of a workflow. Further, as illustrated in FIG. 9, a limited number of workflows are displayed in one screen. Thus, when a "next" key K31 is pressed, the invocation screen 9D is switched to a next page, thereby displaying an image showing workflows different from those of FIG. 9. Further, when a "back" key K32 is pressed, the invocation screen 9D is switched to a previous page.

Next, description is given of displaying and setting performed when a workflow is invoked. Note that, when a workflow is invoked, as the display format of a screen for setting, the Wizard format, the Menu format, and the list display format are prepared. Which display format is used for display is set at the time of registering a workflow as described above. Now, for each of the display formats, description is given of an outline of a case where a workflow is invoked.

[Wizard Format]

First, referring to FIG. 10, the Wizard format for a workflow is described. For example, FIG. 10 illustrates an example of a workflow displayed in the Wizard format when the workflow of "poster print" of FIG. 9 is invoked. Note that, in FIG. 10, a case where setting an additional display to be described later is not conducted is described as an example.

The workflow of "poster print" is created and registered so as to include the setting items of "density adjustment" (setting item included in the image quality tab TB2: see FIG. 4A) and "poster print" (setting item included in the layout/edit tab TB3: see FIG. 4B). Further, the workflow is created and registered so as to display the setting screens 9 for the respective setting items in order of from the setting screen 91 of "density adjustment" to the setting screen 92 of "poster print". Note that, open white arrows of FIG. 10 indicate the display sequence. Note that, each of the setting screens 9 used when a workflow is invoked is the same as that at the time of workflow registration or at the time of normal setting.

In each setting screen 9, a "back" key K33 and a "next" key K34 are arranged. When the "back" key K33 is pressed, the liquid crystal display portion 11 displays the setting screen 9 for the previous setting item. On the other hand, when the "next" key K34 is pressed, the liquid crystal display portion 11 displays the setting screen 9 for the next setting item. The user presses a setting key arranged in each setting screen 9, to thereby set a setting value for each setting item.

Note that, in a case where a default setting value is already set for a setting item at the time of creating and registering a workflow, the default value is stored as part of the workflow in the storage device 82 or the memory 18. For example, in a case where the workflow has been created with a finished size "A2" as the default value for poster print, when the setting screen 92 of "poster print" is displayed for the first time, the liquid crystal display portion 11 displays the A2 key K15 as already being selected (see FIG. 10).

Then, when the setting of all the setting items registered in advance as the workflow is completed (for example, when the "next" key K34 is pressed on the setting screen 92 of "poster print"), the liquid crystal display portion 11 displays a setting confirmation list 94. In the setting confirmation list 94, the setting items included in the workflow and the setting values of the respective setting items are displayed. In addition, in the setting confirmation list 94, an execution start key K35 is displayed. Then, when the execution start key K35 is pressed, the display control portion 10 transmits the set contents to the primary control portion 8. The primary control portion 8 recognizes the contents displayed in the setting confirmation list 94, and controls the multifunction peripheral 100 based on the recognized contents, thereby executing a job.

[Menu Format]

Next, referring to FIG. 11, the Menu format for a workflow is described. For example, FIG. 11 illustrates an example of the menu screen 9E in the Menu format displayed when the workflow of "poster print" of FIG. 9 is invoked.

As illustrated in FIG. 11, in the Menu format, for example, when the workflow of "poster print" is invoked, there are displayed a menu image i1 of "density adjustment", and a menu image i2 of "poster". Accordingly, depending on the selected workflow, different menu images are displayed on the menu screen 9E. Then, in each of the menu images, the default setting value is also displayed. As described above, in the Menu format, the setting items included in the workflow are displayed as a menu.

The user presses the menu image of the setting item of which he/she desires to change the setting value. With this, the displaying of the liquid crystal display portion 11 switches to the setting screen 9 for each setting item as illustrated in, for example, FIG. 10. Then, when the setting on the setting screen 9 is completed, the liquid crystal display portion 11 displays the menu screen 9E illustrated in FIG. 11 again.

Further, on the menu screen 9E, an OK key K36 and a cancel key K37 are arranged. When the OK key K36 is pressed, the liquid crystal display portion 11 displays the setting confirmation list 94 illustrated in FIG. 10. Details of the setting confirmation list 94 may be the same as in the case described with reference to FIG. 10, and hence description thereof is herein omitted. On the other hand, when the cancel key K37 is pressed, the settings using the workflow are canceled.

[List Display Format]

Next, referring to FIG. 10, the list display format for a workflow is described. In the list display format, when a workflow to be used is selected on the invocation screen 9D of FIG. 9, the setting confirmation list 94 illustrated in FIG. 10 is displayed on the liquid crystal display portion 11 first. Details of the setting confirmation list 94 may be the same as in the case of the Wizard format described with reference to FIG. 10, and hence description thereof is herein omitted.

As described above, when a program is invoked, the display portion (liquid crystal display portion 11) of the display input device (operation panel 1) performs displaying in any one of the display formats: the Wizard format in which the respective setting items included in the program are sequentially displayed in an interactive manner; the list display format in which the respective setting items included in the program are displayed in a list in an aligned manner; and the Menu format in which the images showing the respective setting items included in the program are displayed (within a single screen).

(Additional Display)

Figure 12:
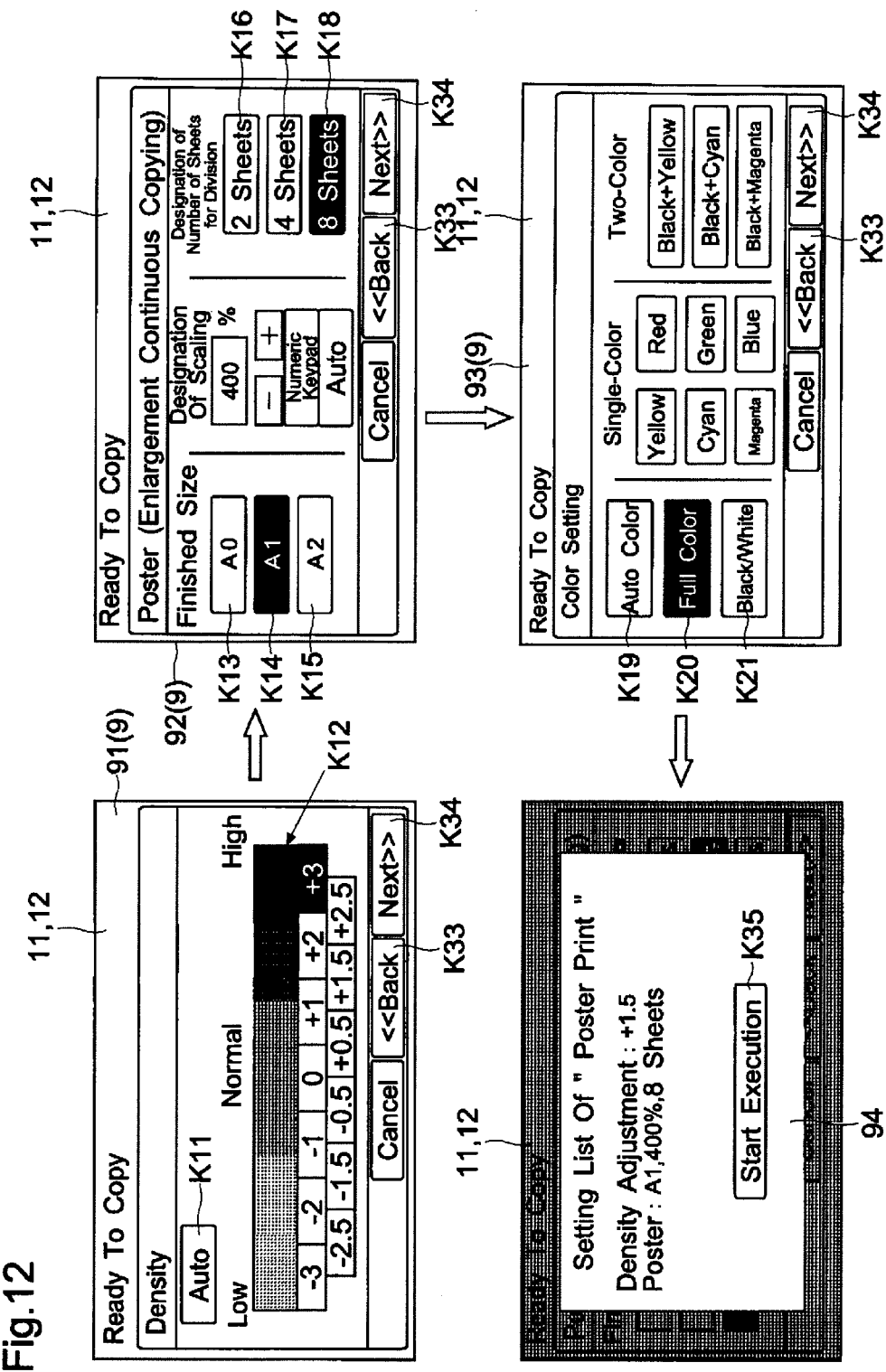
FIG. 12 is an explanatory diagram illustrating an example of additional display on an operation panel in a workflow.

Next, referring to FIG. 12, description is given of an example of additional display on the operation panel 1 in the workflow according to the embodiment. FIG. 12 is an explanatory diagram illustrating an example of the additional display on the operation panel 1 in the workflow.

First, when a setting item highly relevant to the setting item included in the invoked program is not included in the program, the operation panel 1 (liquid crystal display portion 11) of this embodiment can perform the additional display in which the setting screen 9 for the highly-relevant setting item is automatically added and displayed. This prevents a result of executing the job from becoming unintended one for the user.

Now, description is given of how necessary the additional display is. As described above, the user can create and register a workflow as a program. However, in some cases, the user may register a workflow without including, in the workflow, a setting item highly relevant to the setting item included in the workflow.

In many cases, when the relevance is high, such a setting item needs to be set along with the setting items included in the workflow so that the user can obtain a desired result of executing the job. For example, the function (setting item) of poster print is used when a document is enlarged and printed to thereby obtain a large-sized printed material. Printing using the function of poster print is performed, for example, in a case where a printed material is exhibited for an advertising purpose, or a case where a document having a finely-detailed image thereon is enlarged entirely. In such a case, the setting item of "poster print" is highly relevant to the image quality of an image on the printed material. Accordingly, it can be said that the setting item of "poster print" is highly relevant to, for example, the setting item of "density adjustment" and the setting item of "color setting".

However, for example, the setting item of "color setting" is not included in the above-mentioned workflow of "poster print". Thus, when the above-mentioned workflow of "poster print" is executed to perform a copy job, an unintended result (printed material) may be obtained for the user because no setting has been made regarding color setting. The printed material thus obtained becomes a waste. In addition, the user needs to make settings again, which is troublesome.

Next, referring to FIG. 12, specific description is given of an example of the additional display of the setting screen 9 with respect to the workflow. FIG. 12 illustrates transition of the setting screens 9 observed when the above-mentioned workflow of "poster print" is invoked, and the additional display is performed. Note that, description is given of an example in which, in the Wizard format, the added setting screen 9 is displayed at the end of the workflow. In other words, description is given of an example in which, in the Wizard format, the setting screen 93 added at a position immediately before the setting confirmation list 94 is displayed.

As described with reference to FIG. 10, after the workflow of "poster print" is read, when the "next" key K34 is pressed, the display control portion 10 causes the liquid crystal display portion 11 to display the setting screen 91 for the setting item of density adjustment, and then when the "next" key K34 is pressed, causes the liquid crystal display portion 11 to display the setting screen 92 for the setting item of "poster print".

Then, because only the setting items of density adjustment and poster print are included in the workflow of "poster print", when the "next" key K34 is pressed on the setting screen 92 for the setting item of poster print, the liquid crystal display portion 11 is supposed to display the setting confirmation list 94.

However, when a setting has been made so as to perform the additional display, the display control portion 10 causes the liquid crystal display portion 11 to perform displaying in such a manner that the setting screen 93 for the setting item of color setting, which is highly relevant to the setting item of poster print, is automatically added to the workflow. Here, in the description herein, a setting item for which the setting screen 9 is additionally displayed in the workflow is referred to as "additional setting item". For example, the liquid crystal display portion 11 additionally displays the setting screen 93 of color setting between the setting screen 92 for the setting item of poster print and the setting confirmation list 94. With this configuration, the user can appropriately make settings so as to obtain a desired result of executing a job. Accordingly, it is possible to reduce occasions in which the result of executing a job becomes unintended one for the user.

(Setting Regarding Additional Display)

Figure 13:
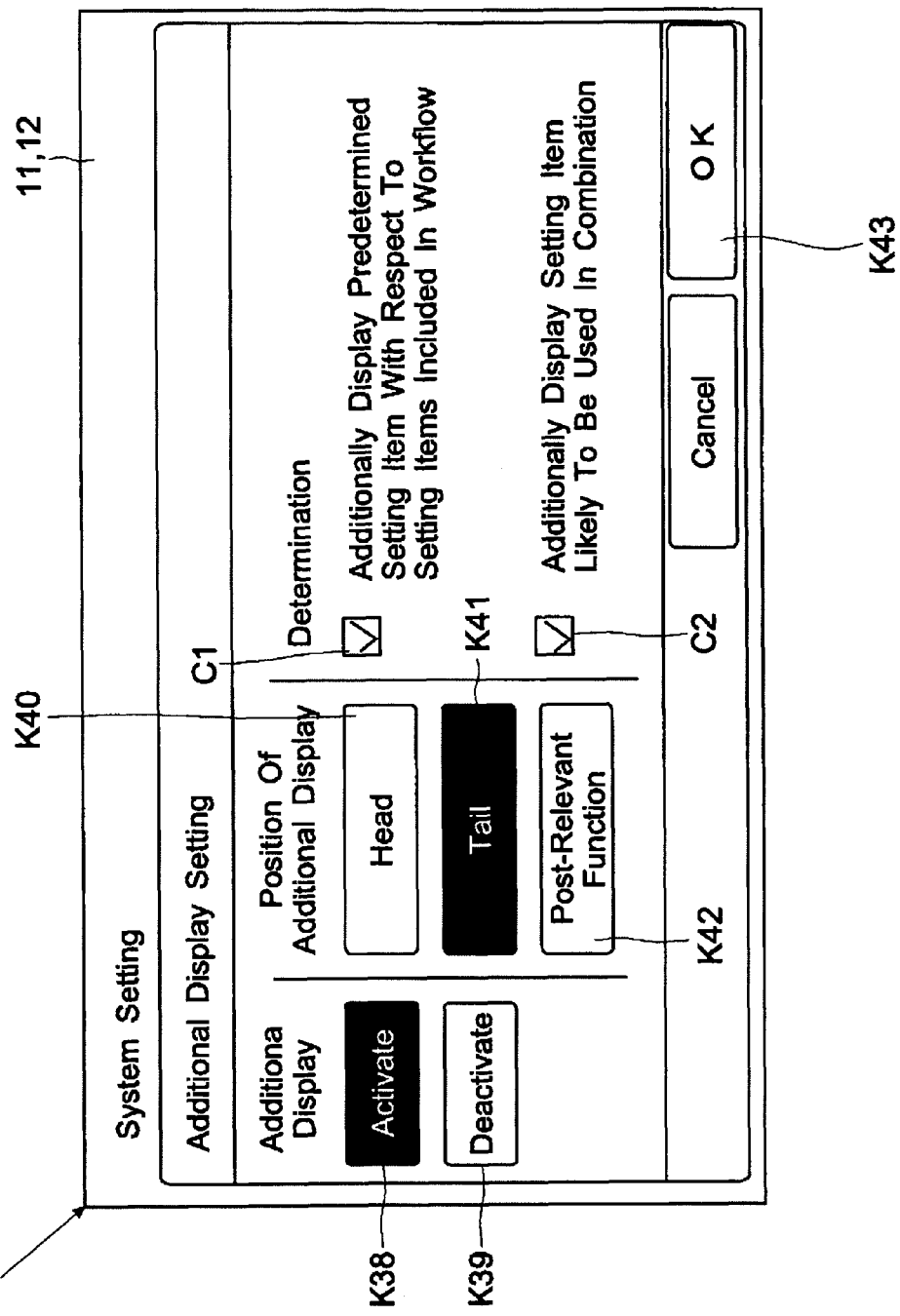
FIG. 13 is an explanatory diagram illustrating an example of an additional display setting screen on the operation panel.
Figure 14:
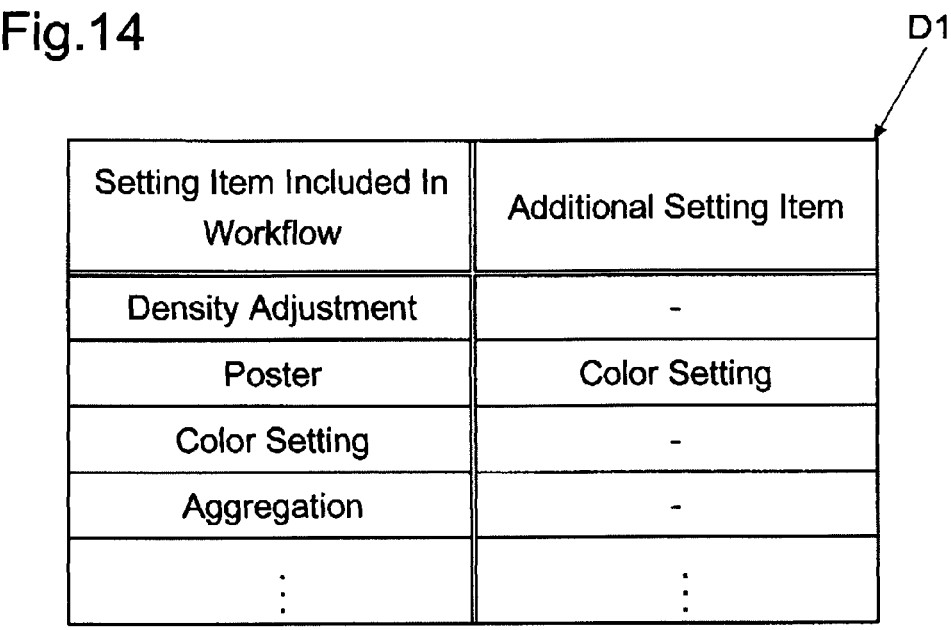
FIG. 14 is an explanatory diagram illustrating an example of data for additional display.

Next, referring to FIGS. 13 to 15, description is given of an example in which settings are made regarding the additional display on the operation panel 1 according to the embodiment. FIG. 13 is an explanatory diagram illustrating an example of an additional display setting screen 95 on the operation panel 1. FIGS. 14 and 15 are each an explanatory diagram illustrating an example of data D for additional display.

First, referring to FIG. 13, description is given of the settings made regarding the additional display. As illustrated in FIG. 13, the user can make settings regarding the additional display on the additional display setting screen 95. Note that, when a predetermined operation is performed on the touch panel portion 12 or the like, the display control portion 10 causes the liquid crystal display portion 11 to display the additional display setting screen 95.

The display control portion 10 causes the liquid crystal display portion 11 to display an activation key K38 and a deactivation key K39 on the additional display setting screen 95. When the additional display is to be performed, the user presses the activation key K38. On the other hand, when the additional display is not to be performed, the user presses the deactivation key K39. With this configuration, the user can make a setting as to whether or not the additional display is to be performed.

Further, in order to set the position of the setting screen 9 that is to be additionally displayed, the display control portion 10 causes the liquid crystal display portion 11 to display a "head" key K40, a "tail" key K41, and a "post-relevant function" key K42 on the additional display setting screen 95. In the workflow, the display sequence of the setting screens 9 for the setting items are determined. Accordingly, by using the "head" key K40, the "tail" key K41, and the "post-relevant function" key K42, the position (order) of the setting screen 9 that is to be additionally displayed is set.

When the user desires to display the setting screen 9 that is to be additionally displayed, at the head position in the display sequence of the workflow, the user presses the "head" key K40. With this configuration, the setting screen 9 that is to be additionally displayed is displayed immediately after the workflow is invoked. Further, when the user desires to display the setting screen 9 that is to be additionally displayed, at the tail position in the display sequence of the workflow, the user presses the "tail" key K41. With this configuration, the setting screen 9 that is to be additionally displayed is displayed immediately before the setting confirmation list 94. Further, in the display sequence of the workflow, when the user desires to display the setting screen 9 that is to be additionally displayed, at a position posterior to the setting item highly relevant to the setting item that is to be additionally displayed, the user presses the "post-relevant function" key K42. With this configuration, the display control portion 10 causes the liquid crystal display portion 11 to display the setting screen 9 that is to be additionally displayed, at the position posterior to the setting item highly relevant among the setting items included in the workflow.

Further, the display control portion 10 checks whether or not there is a setting item that is to be additionally displayed (additional setting item), and causes the liquid crystal display portion 11 to display two checkboxes C for setting criteria regarding for which setting item the setting screen 9 is to be displayed. Note that, when the activation key K38 is pressed, any one of two checkboxes C1 and C2 is always marked. For example, when the activation key K38 is pressed, the checkbox C1 may be automatically marked.

First, in the operation panel 1 and the multifunction peripheral 100 of this embodiment, the display control portion 10 determines whether or not there is an additional setting item with respect to the setting items included in the workflow, and when there is any, determines for which setting item the setting screen 9 is to be displayed. Note that, the primary control portion 8 may make such a determination.

Based on the data D for additional display stored in the memory 18, the display control portion 10 determines whether or not there is an additional setting item that is to be displayed with respect to the setting items included in the workflow, and determines for which setting item the setting screen 9 is to be displayed. For example, the data D for additional display is set in a mode illustrated in FIG. 14.

Note that, the memory 18 of the operation panel 1 (may be replaced with the storage device 82 of the main body) of this embodiment can store two kinds of pieces of the data D for additional display. Accordingly, data for additional display illustrated in FIG. 14 is denoted by "D1". Further, there are a large number of setting items that can be set on the operation panel 1, and in the data D1 for additional display illustrated in FIG. 14, setting items other than the four setting items are omitted.

The data D1 for additional display illustrated in FIG. 14 is predetermined, and shows association of the additional setting item with respect to the setting items included in the workflow. Note that, the data D1 for additional display is prepared by, for example, a manufacturer of the multifunction peripheral 100, but may be rewritten by the user through input on the operation panel 1.

Then, the display control portion 10 recognizes each of the setting items included in the workflow, and then refers to the data D1 for additional display, to thereby check whether or not there exists an additional setting item associated with any one of the setting items included in the workflow. When there exists an additional setting item associated with one of the setting items, the display control portion 10 causes the liquid crystal display portion 11 to display the setting screen 9 for the associated additional setting item.

For example, in the data D1 for additional display of FIG. 14, color setting is associated with the setting item of poster print as the additional setting item. Further, as in the setting item of density adjustment, all the setting items are not necessarily associated with the additional setting item. In the case of the data D1 for additional display illustrated in FIG. 14, when the workflow includes the setting item of poster print, the setting screen 9 of color setting is added to the workflow and then displayed (see FIG. 12).

When the user desires to additionally display the additional setting item set in advance in association with the setting items included in the workflow based on the data D1 for additional display as described above, the user presses the upper checkbox C1 to put a checkmark thereon on the additional display setting screen 95. With this configuration, the setting item set in advance as having high relevance is additionally displayed.

Further, the memory 18 can store another kind of piece of the data D for additional display. Accordingly, data for additional display illustrated in FIG. 15 is referred to as data D2 for additional display. Further, in the data D2 for additional display illustrated in FIG. 15, there are a large number of setting items that can be set on the operation panel 1, and setting items other than the four setting items are omitted.

The data D2 for additional display illustrated in FIG. 15 is obtained by recording the frequency of combined use between the setting items based on a history obtained through the setting performed on the operation panel 1 by the user. Accordingly, the display control portion 10 updates the data D2 for additional display in the memory 18 every time a job is executed, for example.

For example, as illustrated in FIG. 15, in order to obtain the frequency, the data D2 for additional display contains, for each of the setting items, a total number of times the corresponding setting item has been used. For example, even in the case of using a workflow, the total use count of each of the setting items is counted (added up) while including the case of normal setting in which a workflow is not used. Then, for example, the data D2 for additional display contains, for each of the setting items, the number of times the setting item has been used in combination and a frequency value obtained through an arithmetic operation of the display control portion 10 so that the frequency is obtained with respect to each of the setting items used in combination. For example, as illustrated in FIG. 15, the display control portion 10 obtains, as the frequency, a value obtained by dividing the number of times the setting item has been used in combination by the total use count of the setting item, and the resultant value is added to the data D2 for additional display.

When the user desires to perform the additional display with the additional setting item determined by using the count of combined use or the frequency of combined use of each of the setting items (by using the data D2 for additional display) as described above, the user presses the lower checkbox C2 to put a checkmark thereon on the additional display setting screen 95. With this configuration, a setting item that is likely to be used in combination with the setting item included in the workflow is additionally displayed. Accordingly, the additional setting item can be determined in accordance with the actual condition of the setting made by the user. Note that, a checkmark may be put on both the checkbox C1 and the checkbox C2 to select both checkboxes.

Then, on the additional display setting screen 95, there is provided an OK key K43. When the OK key K43 is pressed, the following settings are stored in the memory 18 (may be replaced with the storage device 82 of the main body): whether or not to perform the additional display; the display position of the additional display; and when the additional display is to be performed, for which setting item the setting screen 9 is to be displayed.

(Display Control of Workflow)

Figure 16:
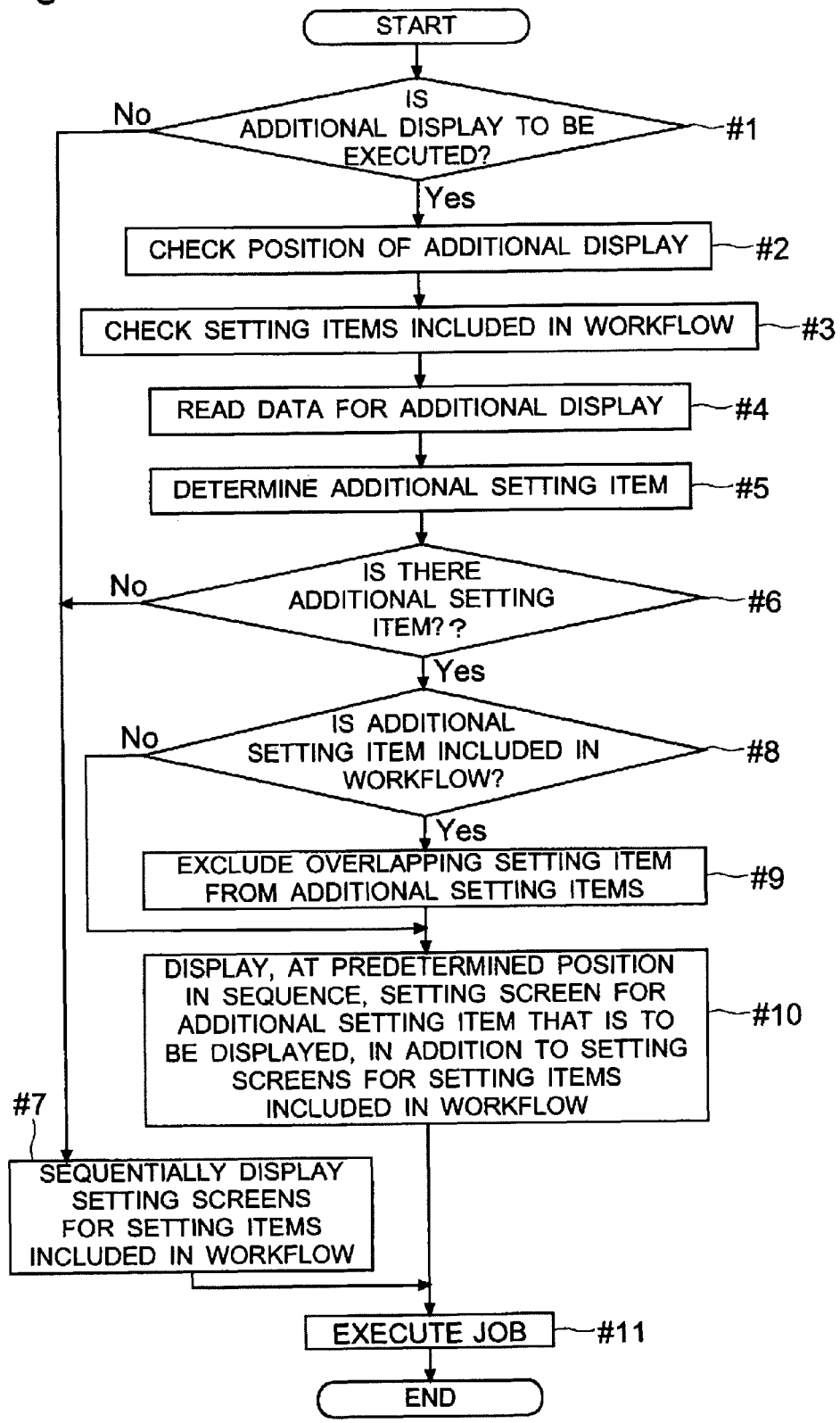
FIG. 16 is a flow chart for describing an example of workflow display control performed on the operation panel.

Next, referring to FIG. 16, description is given of an example of workflow display control performed on the operation panel 1 according to the embodiment. FIG. 16 is a flow chart for describing the example of the workflow display control performed on the operation panel 1.

First, the start of FIG. 16 represents a time point when after the workflow key 17 is pressed to select a workflow on the invocation screen 9D, the display control portion 10 has received data on the workflow from the memory 18 or the storage device 82, and is causing the liquid crystal display portion 11 to display the invoked workflow on the liquid crystal display portion 11.

Subsequently, the display control portion 10 checks the storage contents of the memory 18, to thereby check whether or not the setting is for performing the additional display (Step #1). Specifically, the display control portion 10 checks which one of the activation key K38 and the deactivation key K39 has been pressed on the additional display setting screen 95.

When the setting is for performing the additional display (Yes in Step #1), the display control portion 10 checks the storage contents of the memory 18 or the storage device 82, to thereby check the position (order) at (in) which the setting screen 9 for the additional setting item is to be displayed in the workflow (Step #2). Specifically, the display control portion 10 checks which one of the "head" key K40, the "tail" key K41, and the "post-relevant function" key K42 has been pressed on the additional display setting screen 95. Subsequently, the display control portion 10 checks the setting items included in the invoked workflow (Step #3).

Then, the display control portion 10 reads the data D for additional display (Step #4). For example, the display control portion 10 reads, from the memory 18, the data D for additional display corresponding to the marked checkbox C of the checkbox C1 and the checkbox C2 on the additional display setting screen 95. For example, when only the checkbox C2 is marked, and the checkbox C1 is not marked on the additional display setting screen 95, the display control portion 10 reads only the data D2 for additional display. On the other hand, when both the checkbox C1 and the checkbox C2 are marked on the additional display setting screen 95, the display control portion 10 reads the data D1 for additional display and the data D2 for additional display from the memory 18 or the storage device 82.

Then, based on the thus-read data D for additional display, the display control portion 10 checks whether or not there is a setting item (additional setting item) that is to be additionally displayed with respect to the setting items included in the workflow, and determines the additional setting item (Step #5).

For example, in the case of determining the setting item based on a predetermined correspondence relationship, the display control portion 10 refers to the data D1 for additional display to check whether or not there is a setting item associated with, for the additional display, any one of the setting items included in the workflow, thereby determining the additional setting item. On the other hand, in the case of determining the setting item based on the frequency of combined use of the setting item, the display control portion 10 refers to the data D2 for additional display to determine, as the additional setting item, a setting item whose frequency of combined use exceeds a predetermined value (threshold). This predetermined value may be set arbitrarily. For example, in a case where a setting item that is used in combination once in two times or more frequently when setting the setting items is desired to be determined as the additional setting item, the predetermined value is set to 0.5.

Note that, when both the data D1 for additional display and the data D2 for additional display are used to determine the additional setting item, the display control portion 10 consolidates the additional setting item determined based on the data D1 for additional display and the additional setting item determined based on the data D2 for additional display.

Here, there may be no additional setting item associated with the setting items included in the workflow, or there may be no setting item whose frequency of combined use is equal to or larger than the predetermined value with respect to the setting items included in the workflow. Accordingly, the display control portion 10 checks whether or not there is an additional setting item that is to be additionally displayed with respect to the workflow (Step #6).

When there is no additional setting item that is to be additionally displayed (No in Step #6), there is no need to perform the additional display, and hence the display control portion 10 causes the setting screens 9 for the setting items included in the workflow to be displayed sequentially (Step #7).

On the other hand, when there is an additional setting item that is to be additionally displayed (Yes in Step #6), the display control portion 10 checks whether or not the additional setting item determined to be additionally displayed is already included in the workflow (Step #8). Specifically, the display control portion 10 compares the additional setting item and the setting items included in the workflow, to thereby check whether or not there is an overlap.

When there is an overlap (Yes in Step #8), the display control portion 10 excludes the overlapping setting item from the additional setting items that are to be displayed (Step #9). On the other hand, when there is no overlap (No in Step #8), the processing directly proceeds to Step #10.

Then, the display control portion 10 causes the liquid crystal display portion 11 to display, at a predetermined position in the sequence, the setting screen 9 for the additional setting item that is to be displayed, in addition to the setting screens for the setting items included in the workflow (Step #10).

On the other hand, when the setting is not for performing the additional display (No in Step #1), the display control portion 10 causes the setting screens for the setting items included in the workflow to be displayed sequentially (Step #7). Then, in Step #7, a setting input is performed based on the workflow. After that, with the depression of the execution start key K35 on the setting confirmation list 94 being a trigger, the display control portion 10 transmits the setting contents to the primary control portion 8, and the primary control portion 8 controls the respective portions of the multifunction peripheral 100 based on the transmitted setting contents. Consequently, a job is executed (Step #11). Thus, the setting in one workflow and the job execution are completed, which means the end of this control (end).

As described above, the display input device (operation panel 1) of this embodiment includes: the display portion (liquid crystal display portion 11) for displaying a plurality of kinds of executable functions as the setting items, and displaying the setting screens 9 for the setting items; the storage portion (memory 18, storage device 82) for storing: the program (workflow), which is a combination of setting items selected and registered in advance from among a plurality of the setting items, and is invoked to cause the display portion to sequentially display the setting screen 9 for each of the setting items selected and registered in advance; and the data D (D1, D2) for additional display, which is used for determining for which setting item the setting screen 9 is to be additionally displayed when performing the additional display in which the setting screen 9 for the setting item is added to the program and the display portion is caused to display the added setting screen; the input portion (touch panel portion 12 or the like) for receiving: a selection of the setting item and an input with respect to the setting screen 9; when the program is created and registered, an input made to select the setting item that is to be included in the program; and an input made to invoke the registered program; and the processing portion (for example, display control portion 10) for determining, when the registered program is invoked, an additional setting item, which is the setting item to be additionally displayed, based on the data D for additional display, and causing the display portion to additionally display the additional setting item.

With this configuration, it is possible to automatically add the setting screen 9 for the setting item relevant to the setting item included in the program (workflow). In other words, it is possible to automatically add and display the setting screen 9, which has high relevance and is expected to be necessary, so as to obtain an intended result of executing a job for the user. Accordingly, even if the user is not thoroughly familiar with the setting procedure, it is possible to easily prevent the omission of setting, resulting in a higher possibility of obtaining an intended result of executing a job for the user. As a result, the setting of the program becomes easier to perform, and thus the usability and convenience of the display input device (operation panel 1) can be improved. Further, the settings are made so as to obtain an intended result for the user, and hence it is possible to eliminate waste in time, resource, and energy.

Further, the storage portion (memory 18, storage device 82) stores, as the data D1 for additional display, data in which the additional setting item is set in advance in association with the setting item, and the processing portion (for example, display control portion 10) causes the display portion (liquid crystal display portion 11) to additionally display the additional setting item that is set in the data D1 for additional display and is associated with the setting item included in the program (workflow). With this configuration, it is possible to add, to the program, the setting screen 9 for the setting item that is considered as having high relevance and is associated with the setting item included in the program in advance, and to automatically display the added setting screen 9.

Further, the storage portion (memory 18, storage device 82) stores, as the data D2 for additional display, data for obtaining a frequency of combined use of each of the setting items, and the processing portion (for example, display control portion 10) is configured to: refer to the data; determine, as the additional setting item, the setting item whose frequency of combined use with respect to the setting item included in the program (workflow) exceeds a predetermined value; and cause the display portion (liquid crystal display portion 11) to additionally display the determined additional setting item. With this configuration, it is possible to add, to the program, the setting screen 9 for the setting item that is likely to be used in combination with respect to the setting item included in the program, and to automatically display the added setting screen 9.

Further, when the setting item determined as the additional setting item is already included in the invoked program (workflow), the processing portion (for example, display control portion 10) prevents the display portion (liquid crystal display portion 11) from additionally displaying the additional setting item that is already included. With this configuration, it is possible to prevent the same overlapping setting screens 9 from being displayed in the invoked program. Therefore, it is possible to prevent a setting from being made repeatedly with respect to the same setting item, with the result that the inconvenience of inputting can be eliminated.

Further, the input portion (touch panel portion 12 or the like) receives a setting input made regarding whether or not the display portion (liquid crystal display portion 11) is to be caused to perform the additional display, and the processing portion (for example, display control portion 10) causes the display portion to perform the additional display when a setting is for performing the additional display. Therefore, it is possible to perform the displaying in accordance with the user's intention, resulting in improved usability for the user.

Further, the input portion (touch panel portion 12 or the like) receives an input specifying a position at which the setting screen 9 for the additional setting item is to be displayed in a sequence of the setting screens 9 to be displayed sequentially in the program (workflow), and the processing portion (for example, display control portion 10) causes the display portion (liquid crystal display portion 11) to additionally display the additional setting item at the input position in the sequence. With this configuration, it is possible to display the setting screen 9 to be additionally displayed, at a position desired by the user in the display sequence of the setting screens 9 of the program. Therefore, the displaying can be performed in accordance with the user's intention.

Further, the input portion (touch panel portion 12 or the like) receives an input selecting, in a display sequence of the program (workflow), any one of the head position, the tail position, and the position posterior to the setting item highly relevant to the additional setting item, so as to display the setting screen 9 for the additional setting item, and the processing portion (for example, display control portion 10) causes the display portion (liquid crystal display portion 11) to additionally display the additional setting item at the selected position in the sequence. With this configuration, simply by selecting the position, it is possible to cause the setting screen 9 for the additional setting item to be displayed at the desired position.

Further, the image forming apparatus (for example, multifunction peripheral 100) includes the display input device (operation panel 1) of this embodiment. With this configuration, when performing the setting on the image forming apparatus (for example, multifunction peripheral 100), it becomes easier to obtain an intended result of executing a job for the user, and the setting of the program (workflow) becomes easier to perform. Therefore, it is possible to provide an image forming apparatus (for example, multifunction peripheral 100) having improved convenience, in which the setting input is easier to perform.

Next, another embodiment is described. In the embodiment described above, the display control portion 10 checks whether or not there is an additional setting item to be additionally displayed, and determines the additional setting item. However, such processing may be performed by the primary control portion 8, and the primary control portion 8 may give an instruction of additional display to the display control portion 10. In this case, the primary control portion 8 also functions as the processing portion for the operation panel 1.

Further, in the example given above, the data D1 for additional display and the data D2 for additional display are stored in the memory 18. However, the storage device 82 on the main body side may store the data D1 for additional display and the data D2 for additional display. Then, the storage device 82 provides the data D1 for additional display and the data D2 for additional display to the display control portion 10 and the primary control portion 8. In this case, the storage device 82 also functions as the storage portion for the operation panel 1.

The embodiments of the present invention have been described, but the scope of the present invention is not limited thereto. The present invention may be implemented by making various modifications thereto without departing from the gist of the present invention.

What is claimed is:

1. A display input device, comprising:
    a display portion for displaying a plurality of kinds of executable functions as setting items, and displaying setting screens for the setting items;
    a storage portion for storing:
        a program, which is a combination of setting items selected and registered in advance from among a plurality of the setting items, and which is invoked to cause the display portion to sequentially display the setting screen for each of the setting items selected and registered in advance; and
        additional display data indicating an additional setting item for which an added setting screen is to be additionally displayed when the additional setting item is added to the program;
    an input portion for receiving:
        a setting item selection and a setting screen input;
        when the program is created and registered, an input made to select a setting item that is to be included in the program; and
        an input made to invoke the registered program; and
    a processing portion for determining, when the registered program is invoked, the additional setting item based on the additional display data, and causing the display portion to additionally display the additional setting item in the added setting screen if the additional setting item is not already included in the invoked program, and preventing the display portion from additionally displaying the additional setting item if the additional setting item is already included in the invoked program.

2. A display input device according to claim 1,
    wherein the storage portion stores, as the data for additional display, data in which the additional setting item is set in advance in association with the setting item, and
    wherein the processing portion causes the display portion to additionally display the additional setting item that is set in the data for additional display and is associated with the setting item included in the program.

3. A display input device according to claim 1,
    wherein the storage portion stores, as the data for additional display, frequency data for obtaining a frequency of combined use of each of the setting items, and
    wherein the processing portion is configured to:
        refer to the frequency data;
        determine, as the additional setting item, the setting item whose frequency of combined use with respect to the setting item included in the program exceeds a predetermined value; and
        cause the display portion to additionally display the determined additional setting item.

4. A display input device according to claim 1,
    wherein the input portion receives a setting input made regarding whether or not the display portion is to be caused to perform the additional display, and
    wherein the processing portion causes the display portion to perform the additional display when a setting is for performing the additional display.

5. A display input device according to claim 1,
    wherein the input portion receives an input specifying a position at which the setting screen for the additional setting item is to be displayed in a sequence of the setting screens to be displayed sequentially in the program, and
    wherein the processing portion causes the display portion to additionally display the additional setting item at the input position in the sequence.

6. A display input device according to claim 5,
    wherein the input portion receives an input selecting, in a display sequence of the program, any one of a head position, a tail position, and a position posterior to the setting item highly relevant to the additional setting item, so as to display the setting screen for the additional setting item, and
    wherein the processing portion causes the display portion to additionally display the additional setting item at the selected position in the sequence.

7. A display method for a display input device, comprising:
    displaying a plurality of kinds of executable functions as setting items on a display portion;
    displaying setting screens for the setting items on the display portion;
    storing a program, which is a combination of setting items selected and registered in advance from among a plurality of the setting items, and which is invoked to cause the display portion to sequentially display the setting screen for each of the setting items selected and registered in advance;
    storing additional display data indicating an additional setting item for which an additional setting screen is to be additionally displayed when the additional setting item is added to the program;
    receiving a setting item selection and a setting screen input;
    receiving, when the program is created and registered, an input made to select a setting item that is to be included in the program;
    receiving an input made to invoke the registered program; and
    determining, when the registered program is invoked, an additional setting item based on the additional display data, and causing the display portion to additionally display the additional setting item if the additional setting item is not already included in the invoked program, and preventing the display portion from additionally displaying the additional setting item if the additional setting item is already included in the invoked program.

8. A display method for a display input device according to claim 7, further comprising:
    storing, as the data for additional display, data in which the additional setting item is set in advance in association with the setting item; and
    causing the display portion to additionally display the additional setting item that is set in the data for additional display and is associated with the setting item included in the program.

9. A display method for a display input device according to claim 7, further comprising:

storing, as the data for additional display, frequency data for obtaining a frequency of combined use of each of the setting items;

referring to the frequency data;

determining, as the additional setting item, the setting item whose frequency of combined use with respect to the setting item included in the program exceeds a predetermined value; and causing the display portion to additionally display the determined additional setting item.

10. A display method for a display input device according to claim 7, further comprising:

receiving a setting input made regarding whether or not the display portion is to be caused to perform the additional display; and causing the display portion to perform the additional display when a setting is for performing the additional display.

11. A display method for a display input device according to claim 7, further comprising:

receiving an input specifying a position at which the setting screen for the additional setting item is to be displayed in a sequence of the setting screens to be displayed sequentially in the program; and causing the display portion to additionally display the additional setting item at the input position in the sequence.

12. A display method for a display input device according to claim 11, further comprising:

receiving an input selecting, in a display sequence of the program, any one of a head position, a tail position, and a position posterior to the setting item highly relevant to the additional setting item, so as to display the setting screen for the additional setting item; and causing the display portion to additionally display the additional setting item at the selected position in the sequence.

13. An image forming apparatus, comprising the display input device according to claim 1.

\* \* \* \* \*